(12) United States Patent
Ingersoll et al.

(10) Patent No.: US 10,672,528 B2
(45) Date of Patent: Jun. 2, 2020

(54) MULTI-MODULAR POWER PLANT WITH DEDICATED ELECTRICAL GRID

(71) Applicant: NuScale Power, LLC, Corvallis, OR (US)

(72) Inventors: Daniel Ingersoll, Oak Ridge, TN (US); Jose N. Reyes, Jr., Corvallis, OR (US); Bill Galyean, Corvallis, OR (US); Jeremiah Doyle, Corvallis, OR (US); Ted Hough, Albany, OR (US); Ross Snuggerud, Corvallis, OR (US)

(73) Assignee: NUSCALE POWER LLC, Corvallis, OR (US)

( * ) Notice: Subject to any disclaimer, the term of this patent is extended or adjusted under 35 U.S.C. 154(b) by 673 days.

(21) Appl. No.: 15/369,528

(22) Filed: Dec. 5, 2016

(65) Prior Publication Data

US 2017/0178756 A1 Jun. 22, 2017

Related U.S. Application Data

(60) Provisional application No. 62/312,094, filed on Mar. 23, 2016, provisional application No. 62/268,992, filed on Dec. 17, 2015.

(51) Int. Cl.
| | |
|---|---|
| *G21D 1/02* | (2006.01) |
| *G21D 3/04* | (2006.01) |
| *G21C 1/32* | (2006.01) |

(52) U.S. Cl.
CPC ............... *G21D 1/02* (2013.01); *G21C 1/32* (2013.01); *G21D 3/04* (2013.01); *Y02E 20/16* (2013.01); *Y02E 30/40* (2013.01)

(58) Field of Classification Search
USPC .......................................................... 307/43
See application file for complete search history.

(56) References Cited

U.S. PATENT DOCUMENTS

| | | | |
|---|---|---|---|
| 4,302,297 A | 11/1981 | Severs | |
| 2007/0090723 A1* | 4/2007 | Keolian | ............... H01L 41/113 310/311 |

(Continued)

FOREIGN PATENT DOCUMENTS

WO 2014/113611 A1 7/2014

OTHER PUBLICATIONS

International Preliminary Report on Patentability and Written Opinion for International Application No. PCT/US2016/065589 dated Jun. 28, 2018.

(Continued)

*Primary Examiner* — Rexford N Barnie
*Assistant Examiner* — Xuan Ly
(74) *Attorney, Agent, or Firm* — Perkins Coie LLP

(57) ABSTRACT

A multi-modular power plant includes a plurality of on-site nuclear power modules that generate a power plant output, and a number of power plant systems which operate using electricity associated with a house load of the power plant. A switchyard associated with the power plant may electrically connect the power plant to a distributed electrical grid. The distributed electrical grid may be configured to service a plurality of geographically distributed consumers. Additionally, the switchyard may electrically connect the power plant to a dedicated electrical grid. The dedicated electrical grid may provide electricity generated from the power plant output to a dedicated service load, and the power plant output may be equal to or greater than a combined load of the dedicated service load and the house load. At least a portion of the power plant output may be distributed to both the power plant systems and the dedicated electrical grid.

18 Claims, 12 Drawing Sheets

(56) References Cited

U.S. PATENT DOCUMENTS

2013/0272471 A1* 10/2013 Graham .................. G21C 9/00
              376/277
2019/0267804 A1*  8/2019 Matan ...................... H02J 3/00

OTHER PUBLICATIONS

International Preliminary Report on Patentability and Written Opinion for International Application No. PCT/US2016/064992 dated Jun. 28, 2018.
International Search Report and Written Opinion for International Application No. PCT/US2016/065589 dated Mar. 17, 2017.
International Search Report and Written Opinion for International Application No. PCT/US2016/064992 dated Sep. 19, 2017.
Reyes Jr., NuScale Plant Safety in Response to Extreme Events, Nuclear Technology, vol. 178, pp. 1-11, May 2012.

* cited by examiner

MULTI-MODULAR POWER PLANT WITH DEDICATED ELECTRICAL GRID

STATEMENT OF RELATED MATTERS

This application claims priority to U.S. Provisional Patent Application No. 62/268,992, filed on Dec. 17, 2015 and entitled Highly Reliable Nuclear Power for Mission-Critical Applications, and to U.S. Provisional Patent Application No. 62/312,094, filed on Mar. 23, 2016 and entitled Multi-Modular Power Plant, the contents of which are herein incorporated by reference in their entirety.

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for controlling the generation, consumption, output, and reliability of electricity associated with a power plant.

BACKGROUND

Energy demand for certain types of facilities may require a continuous, or near continuous, uninterrupted energy supply with a high level of reliability that the required amount of energy will be available as needed. Some types of facilities may meet their energy reliability requirements by providing a primary energy source, such as a coal or natural gas-fired power plant, together with a backup source of energy, such as a diesel generator and/or batteries. However, there is rapidly increasing concern regarding the environmental impacts of coal and natural gas emissions, which may significantly curtail or preclude their use for power production in the future. Additionally, the backup sources of energy may have a limited energy supply that is intended to operate for a finite time period and/or only provide sufficient power for limited services. A loss of off-site power that exceeds the relatively short time period may result in an interruption of the energy supply that the facility is reliant upon for continued operation.

Known nuclear power plants may also be designed with one or more backup sources of energy that may be used to provide power in the event of a loss of off-site power. Additionally, many nuclear power plants are being designed to perform a non-safety trip in the event of a loss of power, such that the reactor may be shut down and cooled using passive techniques such as gravity, natural circulation and other laws of physics. Nevertheless, the non-safety trip of a nuclear reactor may require a significant number of reactor and/or plant safety functions to perform as expected while the reactor shuts down. Although remote in probability, reactor designs may need to take into account the various scenarios in which one or more of the safety functions may not perform as expected, thereby potentially increasing the cost and complexity of the reactor design.

This application addresses these and other problems.

SUMMARY

A multi-modular power plant is disclosed herein as including a plurality of on-site nuclear power modules that generate a power plant output. One or more of the nuclear power modules may be designated as service module units, or service units, that generate a first portion of the power plant output, and a remainder of the nuclear power modules may generate a second portion of the power plant output. A number of power plant systems may operate using electricity associated with a house load of the power plant, and the first portion of the power plant output may be equal to or greater than the house load. A switchyard may electrically connect the power plant to a distributed electrical grid that services a plurality of geographically distributed consumers. The switchyard may apply the second portion of the power plant output to the distributed electrical grid, and route at least part of the first portion of the power plant output to the power plant systems during a loss of power from the distributed electrical grid.

A method of operating a multi-modular power plant a plurality of on-site nuclear power modules that generate power plant output is disclosed herein. The method may comprise generating a first portion of the power plant output by one or more of the nuclear power modules designated as service module units or service units. A remainder of the nuclear power modules may be non-service module units, or non-service units. A second portion of the power plant output may be generated by the non-service module units. Electricity may be provided to a number of non-emergency power plant systems associated with a house load of the power plant, and the first portion of the power plant output may be equal to or greater than the house load. The power plant may be electrically connected to a distributed electrical grid, and the distributed electrical grid may be configured to service a plurality of geographically distributed consumers. An amount of electricity corresponding to the second portion of the power plant output may be routed to the distributed electrical grid in a first mode of operation in which the power plant is connected to the distributed electrical grid. In a second mode of operation in which the power plant is electrically disconnected from the distributed electrical grid, the second portion of the power plant output may be diverted away from the distributed electrical grid. Additionally, the method may comprise routing an amount of electricity corresponding to at least part of the first portion of the power plant output to the power plant systems in the second mode of operation.

A multi-modular power plant is disclosed herein, comprising means for generating electricity from a first portion of power plant output provided by one or more of a plurality of on-site nuclear power modules designated as service module units. A remainder of the plurality of nuclear power modules may be non-service module units, and the first portion of the power plant output may be equal to or greater than a house load associated with a number of non-emergency power plant systems. The power plant may additionally comprise means for generating electricity from a second portion of the power plant output provided by the non-service module units, and means for electrically connecting the power plant to a distributed electrical grid. The distributed electrical grid may be configured to service a plurality of geographically distributed consumers.

The power plant may comprise means for providing an amount of electricity corresponding to the second portion of the power plant output to the distributed electrical grid while the power plant is connected to the distributed electrical grid, and means for diverting the second portion of the power plant output away from the distributed electrical grid when the power plant is electrically disconnected from the distributed electrical grid. Additionally, the power plant may comprise means for routing an amount of electricity corresponding to at least part of the first portion of the power plant output to the power plant systems while the power plant is electrically disconnected from the distributed electrical grid.

In some examples, the multi-modular power plant may comprise means for connecting the power plant to a dedicated electrical grid, and means for distributing the first portion of the power plant output to both the power plant systems and the dedicated service load while the power plant is electrically disconnected from the distributed electrical grid. The dedicated electrical grid may be configured to provide electricity to a dedicated service load, and the first portion of the power plant output may be equal to or greater than a combined load of the dedicated service load and the house load.

A multi-modular power plant is disclosed herein, as including a plurality of on-site nuclear power modules that generate a power plant output, and a number of power plant systems which operate using electricity associated with a house load of the power plant. A switchyard associated with the power plant may electrically connect the power plant to a distributed electrical grid. The distributed electrical grid may be configured to service a plurality of geographically distributed consumers. Additionally, the switchyard may electrically connect the power plant to a dedicated electrical grid. The dedicated electrical grid may provide electricity generated from the power plant output to a dedicated service load, and the power plant output may be equal to or greater than a combined load of the dedicated service load and the house load. At least a portion of the power plant output may be distributed to both the power plant systems and the dedicated electrical grid.

A method of operating a multi-modular power plant is disclosed herein. The power plant may include a plurality of on-site nuclear power modules, and the method may comprise generating a power plant output by one or more of the on-site nuclear power modules, and providing electricity to a number of non-emergency power plant systems associated with a house load of the power plant. The power plant may be electrically connected to a distributed electrical grid, and the distributed electrical grid may be configured to service a plurality of geographically distributed consumers. Additionally, the power plant may be electrically connected to a dedicated electrical grid, and the dedicated electrical grid may be configured to provide electricity generated from the power plant output to a dedicated service load. The power plant output may be equal to or greater than a combined load of the dedicated service load and the house load. The method may further comprise identifying one or more grid irregularities associated with the distributed electrical grid, and distributing at least a portion of the power plant output to both the non-emergency power plant systems and the dedicated electrical grid in response to identifying the one or more grid irregularities.

A multi-modular power plant is disclosed herein, including means for generating electricity from a power plant output provided by one or more of a plurality of on-site nuclear power modules, in which at least a portion of the electricity is provided to a number of power plant systems associated with a house load of the power plant. Additionally, the power plant may comprise means for electrically connecting the power plant to a distributed electrical grid that services a plurality of geographically distributed consumers, and means for electrically connecting the power plant to a dedicated electrical grid. The dedicated electrical grid may be configured to provide electricity generated from the power plant output to a dedicated service load, and the power plant output may be equal to or greater than a combined load of the dedicated service load and the house load. In some examples, the power plant may comprise means for distributing at least a portion of the power plant output to both the non-emergency power plant systems and the dedicated electrical grid.

DETAILED DESCRIPTION

Various examples disclosed and/or referred to herein may be operated consistent with, or in conjunction with, one or more features found in U.S. application Ser. No. 15/135,324, filed on Apr. 21, 2016 and entitled Fault-Tolerant Power-Distribution Modules for a Power Plant, the contents of which are herein incorporated by reference in their entirety.

Some of the examples described herein may refer to one or more of the following terms:

A distributed electrical grid, or macro-grid, may refer to multiple connected power generation sources electrically connected to an electric grid which may be configured to service a plurality of distributed consumers of electricity.

Droop mode may refer to a form of voltage regulation of a generator where the generator follows the frequency of other generators that it is paralleled to.

Isochronous mode may refer to a form of voltage regulation of a generator where the generator itself controls the frequency of other generators that it is paralleled to.

A load distribution grid may refer to a distribution system which has no other connected power generation sources and only serves as a flowpath for the electricity generated by the power plant to the non-plant electrical load.

A dedicated electrical grid, or micro-grid, may refer to a localized grouping of electricity sources and loads that normally operate connected to and synchronous with the traditional distributed electrical grid, but can disconnect and function autonomously as physical and/or economic conditions dictate.

House loads may refer to internal loads of a power generation facility necessary to produce energy for commercial use.

Degraded voltage may refer to the level of transmission grid voltage from the distributed electrical grid that would represent a point at which house loads could not reliably perform their intended function.

A station blackout may refer to a complete loss of alternating current (AC) electric power to the essential and nonessential switchgear buses in a nuclear power plant (i.e., loss of offsite electric power system concurrent with turbine trip and unavailability of the onsite emergency AC power system).

A black start may refer to the ability of a power generation facility to achieve power production mode from a shutdown configuration without back-feed from the distributed electrical grid.

Island mode is a term that may be used to describe operation of a power generating facility independent of any connection to the distributed electrical grid.

Figure 1:
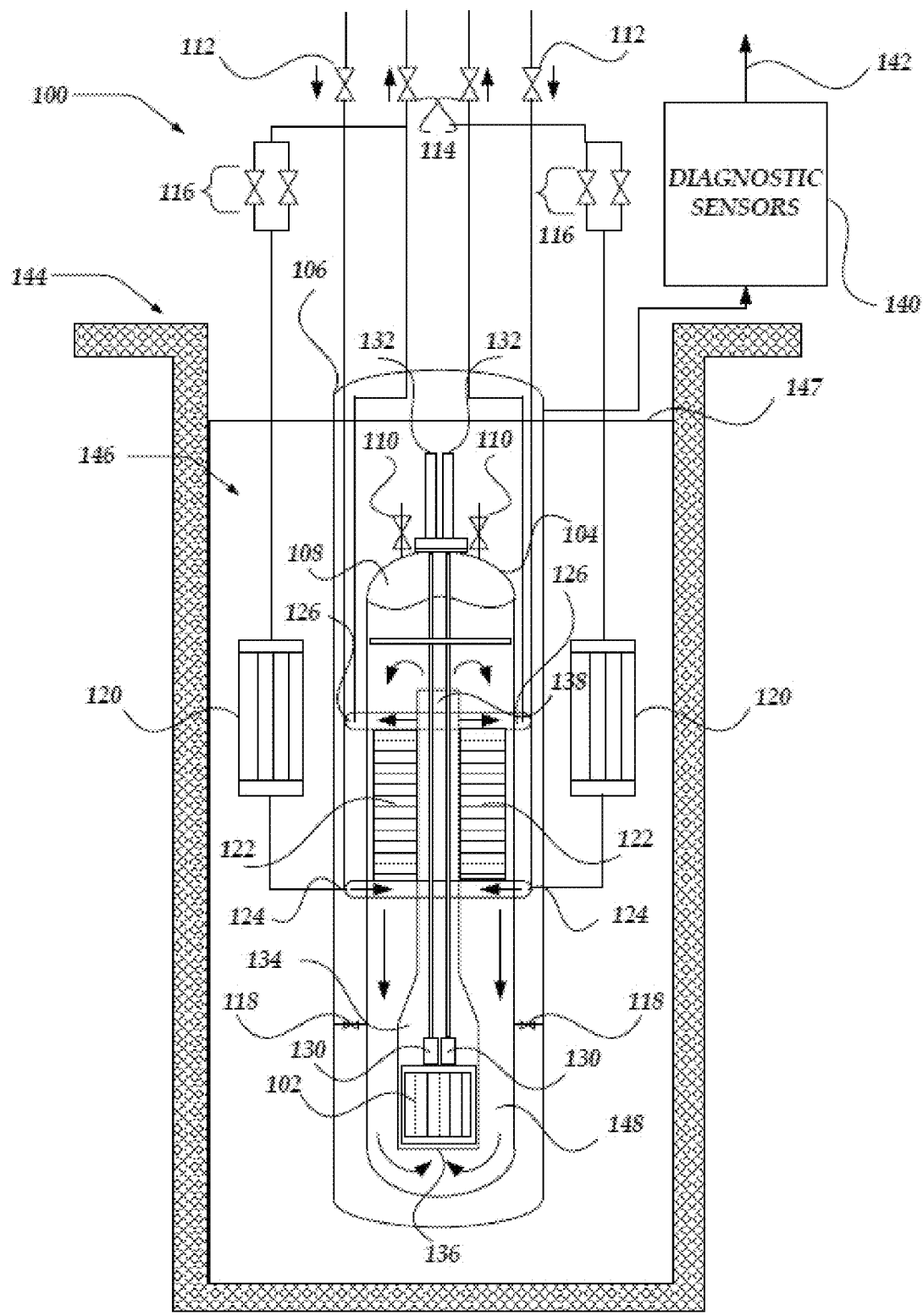
FIG. 1 illustrates a schematic diagram of an example power module.

FIG. 1 illustrates a schematic diagram of an example power module 100. The power module 100 may comprise an integral reactor pressure vessel (RPV) 104 and a containment vessel 106. In some examples, the RPV 104 may be approximately 17.7 m (58 ft) tall and 3.0 m (10 ft) in diameter. The RPV 104 may contain a reactor core 102 having a number of fuel assemblies and control rods 130. In some examples, reactor core 102 may comprise approximately thirty seven fuel assemblies and sixteen control rod clusters. Above reactor core 102 is a central hot riser tube 138, a pair of helical coil steam generators or heat exchangers 120 that at least partially surround the riser tube 138, and an internal pressurizer 108.

FIG. 1 also illustrates an example flow path for primary coolant 148. Primary coolant 148 may circulate upward through the reactor core 102, and the heated primary coolant 148 may be transported upward through the riser tube 130, The flow path of the primary coolant 148 may then be turned downward at a pressurizer plate that separates the main body of reactor vessel 104 from pressurizer 108. The primary coolant 148 may flow over the shell side of the heat exchangers 120, where it is cooled by conduction of heat to the secondary coolant contained within the heat exchangers 120. The primary coolant 148 may then continue to flow downward until its direction is reversed at the lower head of the RPV 104 where the primary coolant 148 may be turned upward back into the reactor core 102. The circulation of primary coolant 148 may be maintained entirely by natural buoyancy forces of the lower density (heated) coolant exiting the reactor core 102, and the higher density (cooled) coolant exiting the annulus of the heat exchangers 120.

On the secondary coolant side, feedwater may be pumped into the steam generator tubes where it boils to generate superheated steam. The steam may be circulated to a dedicated turbine-generator system. Low pressure steam exiting the turbine may be condensed and recirculated to the feedwater system. The entire nuclear steam supply system may be enclosed in a steel vessel, such as containment vessel 106, which in some examples may be approximately twenty three meters tall and approximately five meters in diameter.

In some examples, PGM assembly 100 may comprise a modular nuclear reactor assembly including one or more fission reactors. PGM assembly 100 may be housed in a PGM bay 144. The PGM bay 144 may include a cooling pool 146 of water or some other material that includes thermal properties enabling the cooling of PGM assembly 100. At least a portion of the PGM assembly 100 may be submerged in the cooling pool 146. Accordingly, at least a portion of the PGM assembly 100 may be located below the top of a water line 147 of the cooling pool 146.

Additionally, PGM assembly 100 may comprise a PGM core 102. PGM core 102 may comprise any device, assembly, apparatus, or configuration that is employed to controllably generate heat. Thus, PGM assembly 100 may comprise a heat generating assembly. In some examples, PGM core 102 may comprise a nuclear reactor core, such as but not limited to a fission reactor core. PGM core 102 may be immersed in PGM coolant 148. In at least one example, PGM coolant 148 includes water or any other material that enables the flow of heat (generated by the PGM core 102) away from the PGM core 102.

In some examples, PGM assembly 100 may comprise a core shroud 134 that at least partially constrains, channels, or otherwise guides a flow of PGM coolant 148. As shown in FIG. 1, PGM core 102 may be at least partially surrounded by the core shroud 134. The PGM core 102, the core shroud 134, and the PGM coolant 148 are housed within a pressure vessel 104.

In various examples, PGM core 102 may be configured to generate heat that is transferred to the PGM coolant 148. As shown by the flow arrows, heating the PGM coolant 148 in the pressure vessel 104 may generate a generally vertical circular convection current of the PGM coolant 148. The core shroud 148 may be configured to at least partially constrain, channel, or otherwise guide the generally vertical circular convection current of the PGM coolant 148. A pressurizer 108 may be configured to regulate the internal pressure within pressure vessel 104 that is due to at least the heating and/or the convection current of the PGM coolant 148.

The PGM core 102 may be configured to heat the portion of the PGM coolant 148 that is in the lower plenum 136 of the core shroud 134. The heated PGM coolant 148 flows upward and out of the shroud riser 138. As the PGM coolant 148 flows upward, the heated PGM coolant 148 provides heat to a plurality of steam generators 122. Due to at least this heat exchange, as the heated PGM coolant 148 flows out of the shroud riser 138, the PGM coolant 148 is cooled. As shown by the flow arrows in FIG. 1, once outside of the shroud riser 138, the PGM coolant 148 flows generally downward between the core shroud 134 and the pressure vessel 104. The convection current pulls the cooled PGM coolant 148 near the lower plenum 136 back into the core shroud 134. The PGM core 102 may be configured to reheat the PGM coolant 148 such that the convection current continues to circulate and cool the PGM core 102.

The pressure vessel 104 may be housed within a containment vessel 106. The containment vessel 106 may be configured to prohibit the release of material out of the pressure vessel 104, including any material included in the PGM core 102, as well as the PGM coolant 148. In some examples, the PGM assembly 100 may comprise a plurality of PGM vent valves 110 and/or a plurality of PGM recirculation valves 118 to vent pressure within and/or dissipate excess heat away from the pressure vessel 104.

Feedwater may flow in a circuit that includes the steam generators 122 and electrical generators. Within the steam generators 122, the feedwater may be heated to generate stream. The generated steam flows out of the steam headers 126 and carries the transferred heat away from PGM assembly 100. A plurality of steam isolation valves 114 may be configured to regulate the flow of the steam away from the PGM assembly 100. The steam may be routed via a steam bus, such as but not limited to steam bus 160 of FIG. 2, to electrical generators, such as but not limited to turbine generator 176 of FIG. 2, to generate electrical power or some other form of usable power.

After the energy within the steam generates the electrical power, the return of the cooled feedwater to the PGM assembly 100 may be regulated via a plurality of feedwater isolation valves 112, The cooled feedwater may be returned to the steam generators 122 via the feedwater headers 124, to complete the circuit.

In at least some examples, even after a shutdown of the PGM assembly 100, the PGM core 102 may be configured to continue generating heat. For instance, in examples where the PGM core 102 includes a nuclear reactor core, the nuclear reactor core may continue to generate heat during a decay period associated with the spent fuel within the nuclear reactor core. The heat that is generated after a shutdown of the PGM assembly 100 may be decay heat. Accordingly, to ensure that the PGM core 102 and other components of the PGM assembly 100 do not overheat, at least due to decay heat, the power generated by the PGM core 102 may be dissipated.

To dissipate decay heat in some examples, the PGM assembly 100 includes a decay heat removal system (DHRS). The DHRS may include a plurality of DHRS heat exchangers 120 submerged in the cooling pool 146 of the PGM bay 144, as well as a plurality of a plurality of DHRS valves 116 to divert the flow of the feedwater/steam away from the steam bus.

During a shutdown of the PGM assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of MRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the PGM core 102 may be regulated by the positioning of one or more control rods 130. The positioning of the one or more control rods 130 may be driven by control rod drives 132.

PGM assembly 100 may comprise a plurality of diagnostic sensors 140 schematically shown in FIG. 1. Diagnostic sensors 140 may be configured to sense and/or generate sensor data to monitor various components of PGM module 100. Diagnostic sensors 140 may include various types of sensors, such as but not limited to temperature sensors, pressure sensors, valve configuration sensors control rod positioning sensors, radioactivity sensors, fluid and gas flow sensors, other sensors that monitor parameters of the PGM assembly 100, or any combination thereof. Diagnostic sensors 140 may be configured to provide sensor output signals on a sensor data bus 142. Sensor output data may be diagnostic sensor data, or simply sensor data. Diagnostic sensors 140 may include safety sensors or safety-related sensors, as well as asset protection-related sensors.

Figure 2:
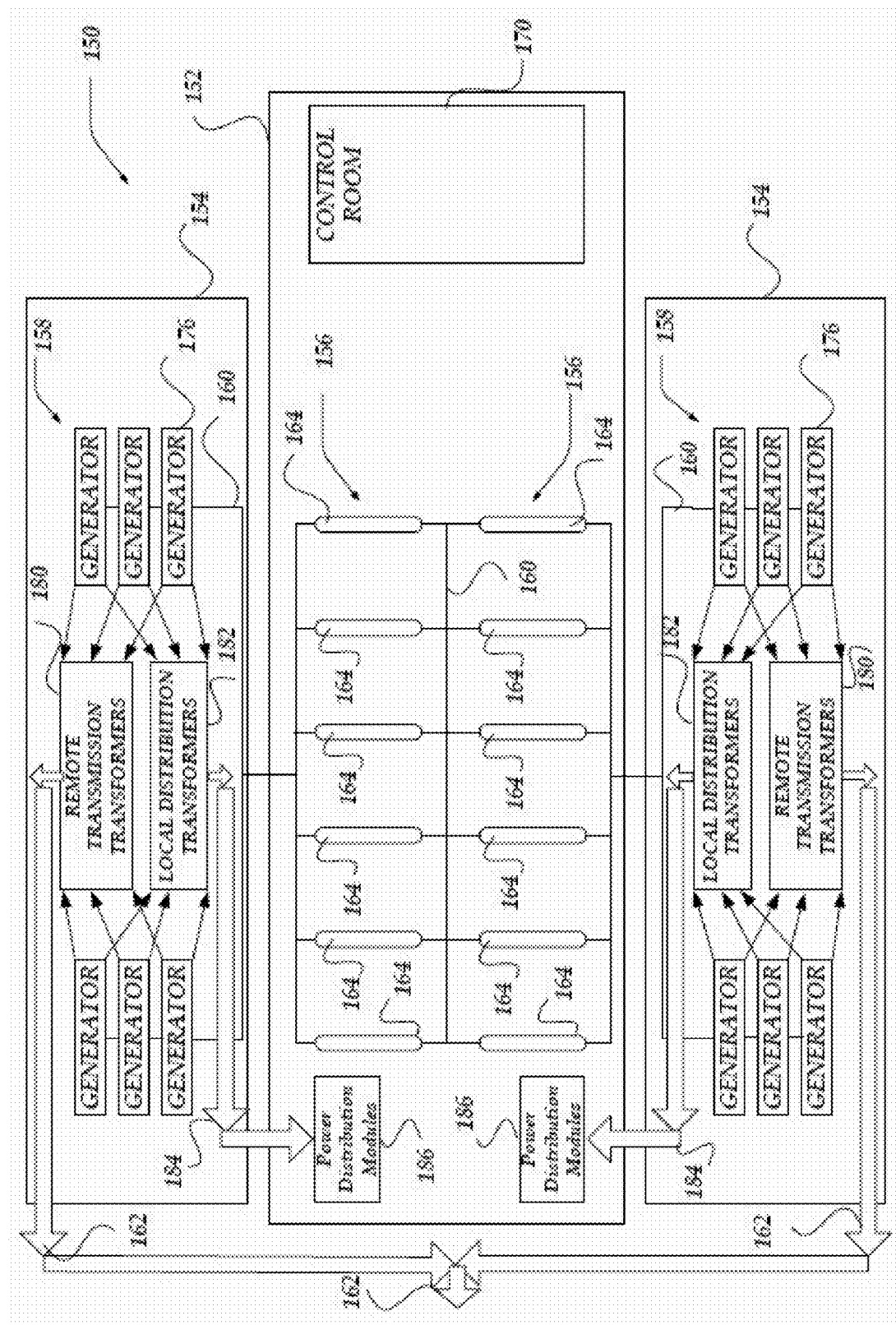
FIG. 2 illustrates a top view of an example power plant comprising a plurality of power modules.

FIG. 2 illustrates a top view of an example power plant 150 comprising a plurality of power modules 164. Each power module 164 may be connected to one or more turbines or generator systems, such as turbine generators 176. The turbine generators 176 may be configured to convert the heat output from the power modules 164 into electricity. In some example, an equal number of turbine generators as reactor modules may be located in one or more generator buildings or housings 154 located proximate to a reactor building or housing 152 which houses the reactor modules 164. Reactor housing 152 may comprise an aircraft-resistant reactor building.

The multiple power modules 164 may be placed in a single large pool, such as cooling pool 146 of FIG. 1, contained within reactor housing 152. The reactor pool may be configured to provide passive containment cooling and decay heat removal for all of the power modules 164. For example, the pool may be configured to provide a heat sink with a capacity to absorb the entire decay heat produced by the reactor cores for greater than thirty days. In some examples, air cooling of the power modules 164 may also be used to cool the reactor cores in combination with, or in addition to, the pool of water.

The power modules 164 may be located below grade in the pool of water. The below grade pool may provide enhanced physical security by providing additional prohibitions against access of the reactor fuel by unauthorized personnel. In addition to providing radiation shielding outside of containment, the pool may also help reduce, delay and/or otherwise prohibit fission product releases out of the reactor housing 152.

Modular power plant 150 and the reactor modules 164 housed therein, may be distinguished from most conventional reactor designs by a number of features. For example, the nuclear steam supply system, including containment, may be entirely prefabricated off site and shipped by rail, truck or barge to the site. This reduces construction time due to parallel fabrication considerations and reduces overall schedule uncertainty due to the reduced amount of on-site construction activities.

Additionally, natural circulation operation and integral design eliminates pumps, pipes, and valves in the primary system and hence the maintenance and potential failures associated with those components, while also reducing the house load. The reactor modules 164 may be configured to safely shut down and self-cool with no operator action, no AC or DC power, and no additional water for an unlimited period of time.

Because each power module, including the power conversion system, may be configured to operate independent of the other modules, each module may be configured to be shut down while other modules continue to operate. This feature allows for continuous plant output and greatly enhances the overall reliability of output power.

Modular power plant 150 includes power-generating module (PGM) assembly array 156. PGM assembly array 156 may comprise one or more PGM assemblies, such as but not limited to PGM assemblies 164. In some examples, at least one of the PGM assemblies 164 included in PGM assembly array 156 may include similar features to PGM assembly 100 of FIG. 1. As shown in FIG. 2, in at least one example, PGM assembly array 156 includes twelve PGM assemblies. However, in other examples, the number of PGM assemblies included in PGM assembly array 156 may comprise more or less than twelve PGM assemblies. A PGM housing 152 may house at least a portion of the PGM assembly array 156.

In some examples, one or more generator housings 154 may be configured to house a generator array 158. Generator array 158 includes one or more devices that generate electrical power or some other form of usable power from steam generated by the PGM assembly array 156. Accordingly, generator array 158 may include one or more electrical generators, such as but not limited to turbine generators 176. As shown in FIG. 2, in at least one example, generator array 158 may comprise twelve electrical generators. However, in other examples, the number of electrical generators included in generator array 158 may comprise more or less than twelve electrical generators. In some examples, there may be a one to one correspondence between each PGM assembly included in PGM assembly array 156 and each electrical generator included in generator array 158.

A steam bus 160 may route the steam generated by PGM assembly array 156 to the generator array 158. The steam bus 160 may provide the one to one correspondence between the PGM assemblies included in the PGM assembly array 156 and the electrical generators included in the generator array 158. For instance, the steam bus 160 may be configured to provide steam generated by a particular PGM assembly exclusively to a particular electrical generator. The steam bus 160 may additionally be configured to prohibit steam generated from other PGM assemblies from being provided to the particular electrical generator.

A portion of the power generated by each of the generators in each of the generator arrays 158 may be transmitted to remote consumers. For instance, a portion of the generated power may be provided to a switchyard and fed into a power grid to be transmitted to remote consumers. This remotely transmitted power may provide electrical power to homes, businesses, and the like.

However, at least another portion of the generated power may be used locally within power plant 150 to at least partially operate power plant 150. For instance, a portion of the generated electrical power may be distributed to various electrical loads within power plant 150. The locally distributed power may be utilized for the operation of power plant 150, such as, but not limited to, providing power to the control room 170 of power plant 150.

In order to match the transmission voltages of the switchyard and a power grid, the portion of the power generated by each generator to be remotely transmitted may be routed, via a power signal, to one or more remote voltage transmission transformers 180. Because the transmission of electrical power may be more efficient at higher voltages, in some examples, the one or more remote transmission transformers 180 may comprise step-up transformers.

FIG. 2 shows the remotely transmitted power portion from each of the generators routed to remote transmission transformers 180. After the voltage is transformed to a transmission voltage, the power to be remotely transmitted is routed, via a remote transmission bus 162 to a switchyard. For examples in which remote transmission transformers 180 may be configured to is provide power for the end users of power plant 150, transformers included in the remote transmission transformers 180 may be main power transformers (MPTs).

In order to provide local power at appropriate voltages within power plant 150, the portion of the power generated by each generator to be locally distributed may be routed, via a power signal, to one or more local distribution voltage transformers 182. Because the various loads within power plant 150 may be configured to use less voltage than the voltage that is output by the generators, the one or more local distribution transformers 182 may comprise step-down transformers. The transformers included in the local distribution transformers 182 may comprise unit auxiliary transformers (UATs).

FIG. 2 shows the locally distributed portion of the power signal from each of the generators routed from the generators to local distribution transformers 182. After the voltage of the power signal is transformed to one or more local distribution voltages, the power signal to be locally distributed may be routed, via a local distribution bus 184, to one or more power-distribution modules (PDM) 186. The PDMs 186 may be configured to provide power to the various loads within power plant 150. The PDMs 186 may be fault-tolerant PDMs.

Certain types of facilities or consumers of energy may require power on a continuous twenty-four hour basis, every day of the year, with a high level of certainty. Examples may include military or defense installations, research facilities, computer centers, industrial plants, and even isolated communities which may not have access to a main power grid or macro-grid due to their remote location. Interruptions in electricity or heat for some consumers may result in substantial financial loss, may create a loss of security, or have other undesirable consequences. The limited capacity of known backup sources of energy such as diesel generators and/or batteries may make these solutions not particularly well suited for consumers which require a high level of power reliability.

Nuclear power plants offer abundant energy with a relatively high capacity factor, but the reactor may nevertheless be shut down for refueling or maintenance on a periodic basis, for example once every few years. This can make it difficult to achieve high power reliability on a power grid, at least during the times that the nuclear power plant has been taken offline. Due to the relatively large capital expense associated with siting and manufacturing a large nuclear power plant, installing multiple power plants on a single site may be effectively impractical from an economic standpoint. However, a power plant designed to accommodate a number of is relatively small modular reactors may be well suited to provide continuous and highly reliable power because of several features related to both the nuclear steam supply system and the overall plant design.

A modular power plant 150 such as that illustrated in FIG. 2 may comprise a plurality of power modules that may be reconfigured and/or scaled up or down in number, according to power requirements that may change over time, or to effectively deal with potential offsite losses of power. The power modules 164 may comprise integral pressured water reactor configurations that yield a simplified and highly robust design. These power modules 164 may not only be moved within reactor housing 152 for refueling and maintenance, but are small enough so that that one or more preassembled reactor modules may be transported over relatively long distances by rail, ship, or even ground.

With a power plant comprising twelve power modules, each configured to generate gross electric power of fifty Megawatt electric (MWe), the power plant may have a peak power generation capacity of approximately 600 MWe. Additionally, modular power plant 150 may be configured to provide varying levels of power on a continuous basis, even when one or more individual modules may be taken offline for refueling or maintenance. In some examples, the reactor modules may be returned to service one at a time to match the demand of the distributed electrical grid in fifty MWe increments to help black start the power plant when power is ready to be restored.

As discussed in further detail with reference to additional drawings disclosed herein, one or more modules in the modular power plant 150 may be configured to provide an on-site or locally generated "house load" in the case of a loss of offsite power. The house load may be used to maintain operation of the one or more modules as well as other on-site systems or operations.

Modular power plant 150 may be configured as a redundant array of integral reactors (RAIR). In analogy to systems employing a redundant array of independent disks (RAID)

to provide highly reliable data storage, the RAIR may be configured to provide a highly reliable power source. In the case of RAID data storage, identical data may be written simultaneously in multiple locations, thus trading storage capacity for reliability. By placing this data on multiple disks, there is inherent confidence in the system that the information can be retrieved when desired. Individual disks can even be "hot swapped," meaning the disk can be replaced while the storage system is operating, without loss of data.

Similarly, in the modular power plant 150, one or more reactor modules may be hot swapped, e.g., they may be removed from operation for refueling or maintenance while the other modules continue to produce power. Therefore, power output from modular power plant 150 may be provided at varying confidence levels, albeit at a reduced total power level when the one or more reactor modules are taken offline, throughout the lifetime of the power plant.

To assure a certain level of power output from a RAIR, an analysis of plant availability considering a number of plant "upsets" may be performed in order to predict a highly reliable level of power which can be consistently output from module power plant 150. To determine the power output level, 50,000 sixty-year power plant lifetimes were simulated. The plant was simulated on a daily basis (i.e. a time step of one day) with a variety of plant upsets included in the analysis. The simulated upsets may include some or all of the following considerations:

Refueling Outages

Each module may be refueled every twenty four months at which time the module is taken offline for a nominal ten days to accomplish refueling and inspection activities. In some examples involving a twelve module power plant, a module may be temporarily taken offline for a refueling, operation once every two months.

Short Term Outages

Short term outages may be initiated by an unplanned reactor trip but do not require the module to be opened to be serviced. During short term outages the module may remain in the reactor bay and multiple modules may be repaired simultaneously. Secondary system upsets may be included in this type of outage.

Long Term Outages

Long term outages may be caused by failure of components internal to the module in which the module is opened in order to conduct repairs.

Two Module Outages

Short term outages may occur for two modules simultaneously due to a loss of an AC bus for example. In these cases, the two modules may be taken offline and returned to service simultaneously.

Plural Module Outages

While many systems may be independent among the power modules, some systems such as the circulating water system that provides cooling to the feed water system condensers, may be common to some if not all of the power modules. For example half, or six of the twelve, modules may be taken offline and repaired simultaneously, followed by a staggered restart.

Total Module Outages

Total module outages can occur due to a failure of equipment that is common to all, e.g., twelve, modules other than loss of offsite power, which may be handled separately of differently. In the case of total module outage, all of the power modules may be taken offline and repaired simultaneously, followed by a staggered restart.

Loss of Offsite Power

A loss of offsite power may affect the whole plant simultaneously. The modules may be suspended from their current state and placed into a loss-of-offsite-power (LOOP) state. In some examples, only refueling can be triggered during a LOOP. Once power is restored, the power modules may be brought online in a staggered fashion, one module at a time. Following LOOP recovery, the modules may be returned to their previous states. If refueling is triggered during a LOOP and the module was in a down state prior to LOOP initiation, the module may be returned to the down state and placed in refueling following recovery from the down state. Otherwise, the module may be placed directly into the refueling state.

Some of the example values, rates, and probabilities provided in the context of the RAM performance may be made assuming that the output of a power module is either 100% (e.g., fifty MWe or full power) or zero. However, other values, rates and probabilities may be obtained wherein one or more of the power modules have an output that may vary from some intermediate power level up to the full power level, for example depending if one or more other power modules have been taken offline.

In some examples, any particular power module may be associated with five or more states, including: operating, refueling, down and closed (closed), down and open (open), or down due to a loss-of-offsite-power (LOOP). In the closed state in which the power module is not operating, repair work may be performed without opening the power module. In the open state, repair work may be performed after opening the power module.

Following refueling, the power module may be returned to full power. The remaining transition rates from operating to closed, open, or LOOP may be determined from a probabilistic risk assessment analysis, using modified initiating event frequencies such as that shown in Table I. The error factor shown in Table I may be understood to provide a measure of uncertainty in a lognormal distribution, and is taken as the ratio of the 95th percentile value of the distribution to the median value of the distribution.

TABLE I

Initiating Event Frequencies

| Initiator Description | Frequency (mcyr$^{-1}$) | Error Factor |
|---|---|---|
| CVCS LOCA Inside Containment - Charging Line | 2.60E−04 | 5.57 |
| CVCS LOCA Outside Containment - Charging Line | 3.00E−04 | 6.86 |
| CVCS LOCA Outside Containment - Letdown Line | 2.56E−04 | 13.18 |
| Spurious Opening of an ECCS Valve | 1.00E−05 | 3.11 |
| Loss of DC Power | 8.86E−05 | 33.44 |
| Loss of Offsite Power | 3.2E−02 | 3.46 |

TABLE I-continued

Initiating Event Frequencies

| Initiator Description | Frequency (mcyr$^{-1}$) | Error Factor |
|---|---|---|
| Steam Generator Tube Failure | 1.30E-03 | 3.40 |
| LOCA inside Containment | 1.62E-03 | 1.78 |
| Secondary Side Line Break | 1.10E-02 | 3.62 |
| Loss of Power Conversion System (PCS) | 1.81E-01 | 1.10 |
| Transient with PCS Available | 1.16 | 1.04 |

To determine the frequency that the module transitions from operating to closed, three initiating event frequencies may be summed together or otherwise considered: loss of DC power, loss of power conversion system, and transient with power conversion system available. These initiating events may not require the module to be opened for repair. For example, the DC batteries and busses may be located external to the module as well as the secondary systems such as the feedwater and condensate system. The frequency of transitioning from the operating state to the closed state may then be then estimated using a lognormal distribution. In some examples, the remaining initiating events in Table I may be understood to contribute to the frequency with which a module transitions from operating to open.

If the power module is in one of the refueling, closed, open, or LOOP states, the power module may remain in that state for a certain number of days before transitioning to another state. For the refueling, closed, or open states, the power module may return to full power after module recovery. In the LOOP state, the power module may return to its previous state which is not necessarily the operating state. For example, if the power module is in the open state with ten days of recovery time remaining when a LOOP is initiated, then that power module may be returned to the open state with ten days of recovery remaining following a return of power to the distributed electrical grid.

The number of days that it takes a power module to transition from the closed state or the open state may vary based on the type of nuclear reactor and on the number of systems associated with the nuclear reactor. In some examples, values ranging from one to twenty-five days may be assumed for the duration of a closed state event, and twenty-six days to approximately one year may be assumed for an open state event. Similarly, recovery time for the power module to transition from a LOOP state or other states may be assumed based on empirical or statistical data that has been accumulated for nuclear reactors.

Figure 3:
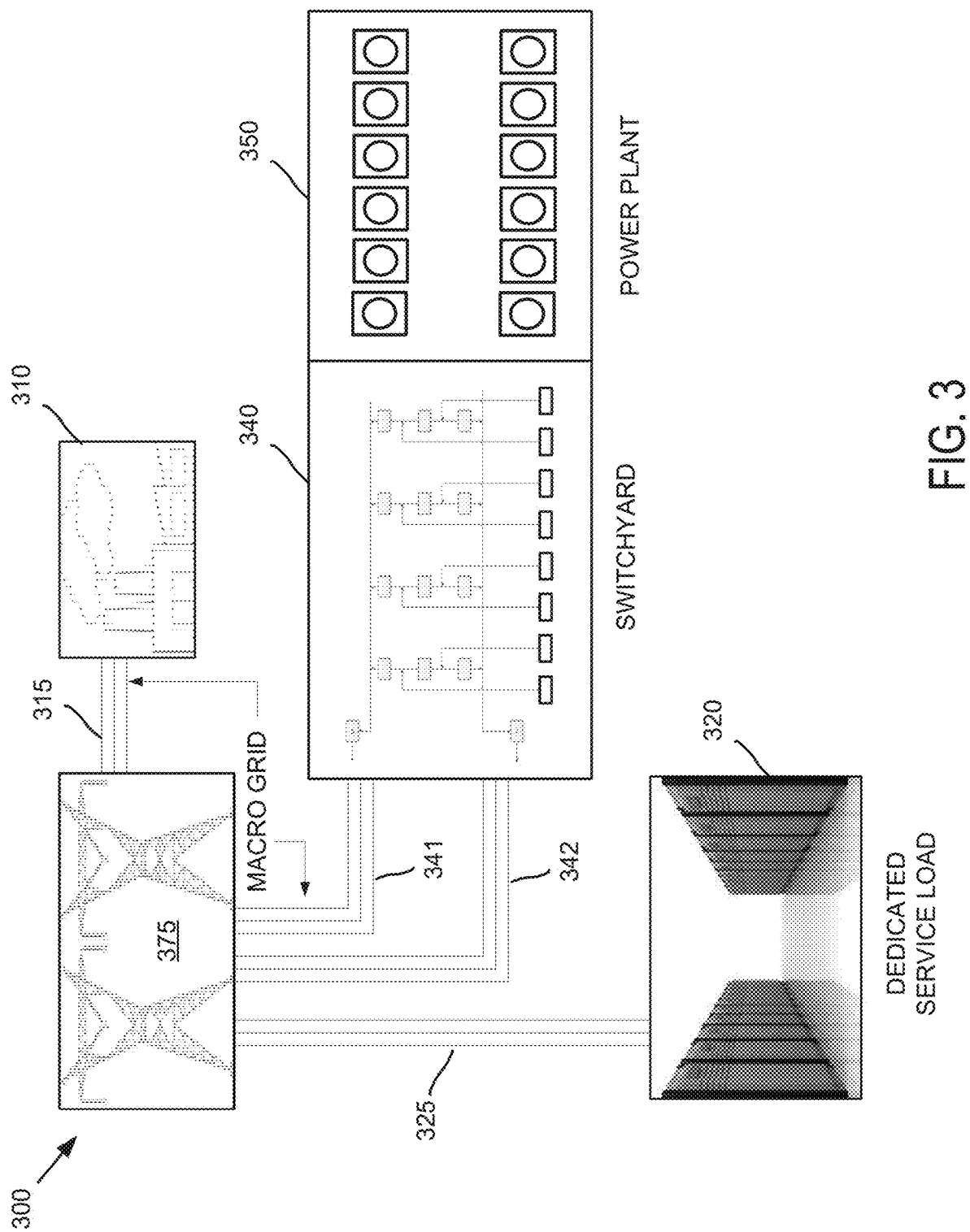
FIG. 3 illustrates an example electrical distribution system configured to provide power to a plurality of consumers.

FIG. 3 illustrates an example electrical distribution system 300 configured to provide power to a plurality of consumers. In some examples, the electrical distribution system 300 may comprise a distributed electrical grid 375 or macro-grid, such as the types of power grids operated by a utility company that may serve a large number of distributed consumers. The plurality of consumers may comprise a first consumer 310 and a second consumer 320.

In some examples, first consumer 310 may comprise a residential customer or a commercial customer that may be electrically connected to distributed electrical grid 375 in order to obtain electricity for powering lights, heating systems, air conditioners, electronic devices, commercial equipment, other types of devices that are powered by electricity, or any combination thereof. First consumer 310 may be electrically connected to distributed electrical grid 375 by a distributed transmission line 315 configured to provide power to a plurality of consumers. For example, distributed transmission line 315 may comprise power lines attached to telephone poles located throughout one or more residential areas. In some examples, at least a portion of distributed transmission line 315 may comprise buried cables located underground.

In the event of a localized or grid-wide power loss, some or all of the consumers could temporarily lose electrical power. For many of the consumers, such as first consumer 310, the loss of power may be inconvenient but unlikely to result in significant economic loss, or have other serious ramifications, particularly if the loss of power is only for a few hours. Furthermore, first consumer 310 may typically meet some or all of its local electrical needs by use of a combustion electrical generator during the period for which the loss of power exists.

In some examples, second consumer 320 may comprise a dedicated service load. For example, second consumer 320 may comprise military or defense installations, research facilities, computer or data centers, industrial plants, banking or retail systems, security systems, telecommunication systems, air traffic control systems, other types of dedicated service loads, or any combination thereof. Second consumer 320 may be electrically connected to distributed electrical grid 375 by a dedicated transmission line 325. In some examples, only one consumer may be electrically connected to distributed electrical grid 375 by any one dedicated transmission line.

A temporary loss of power to second consumer 320 may be associated with significant economic loss, reputational harm, security and safety concerns, and/or loss of data. In some examples, the loss of power may create certain security or safety risks whether at the facilities associated with second consumer 320, or in a broader sense as to other locations and/or remote systems which may rely upon the continued operation of second consumer 320 in providing critical services.

Distributed electrical grid 375 may be configured to prioritize providing power to dedicated transmission line 325, as compared to distributed transmission line 315, in the event of a partial loss of grid power, such as during a brown-out. In times when there is insufficient electricity to meet all the power demands of the plurality of consumers, distributed electrical grid 375 may be configured to initiate a rolling black-out, in which a number of consumers or groups of consumers essentially take turns at experiencing the loss of power. Distributed electrical grid 375 may be configured to prioritize providing power to dedicated transmission line 325 under either a brown-out, or a rolling black-out, so that second consumer 320 may not experience any loss of power.

A switchyard 340 associated with power plant 350 may comprise one or more switchyard connections and a number of main power transformers (MPT). In some examples, a breaker and a half switchyard scheme may be utilized to connect the MPTs to distributed electrical grid 375 via a double bus configuration. For example, the double bus configuration may comprise one or more transmission lines and/or buses, such as a first bus 341 and a second bus 342, that may electrically connect power plant 350 to distributed electrical grid 375. A double bus configuration may provide increase reliability that at least one of the buses 341, 342 is available to transfer electricity from power plant 350 to distributed electrical grid 375 in the event that one of the buses experiences a failure.

Distributed electrical grid 375 may be electrically connected to one or more additional power plants, wind turbines, solar panels, hydroelectric dams, other sources of energy, or any combination thereof. In the event that power plant 350 is taken offline, or may not be generating power, other sources of energy may be relied upon to provide at least some baseline of electrical power on distributed electrical grid 375 for use by the plurality of consumers.

In some examples, one or both of first bus 341 and second bus 342 may additionally be configured to transmit electricity from distributed electrical grid 375 to power plant 350. When power plant 350 is not generating power, electricity from distributed electrical grid 375 may be used to provide power to a lighting system located at power plant 350, in addition to providing power to other local service loads.

While some of the examples provided herein describe a first consumer or a second consumer; however, these terms are provided by way simplified illustration only and are not intended to necessarily suggest a single consumer, unless otherwise indicated. For example, first customer may comprise a first group of consumers and second customer may comprise a second group of consumers.

Figure 4:
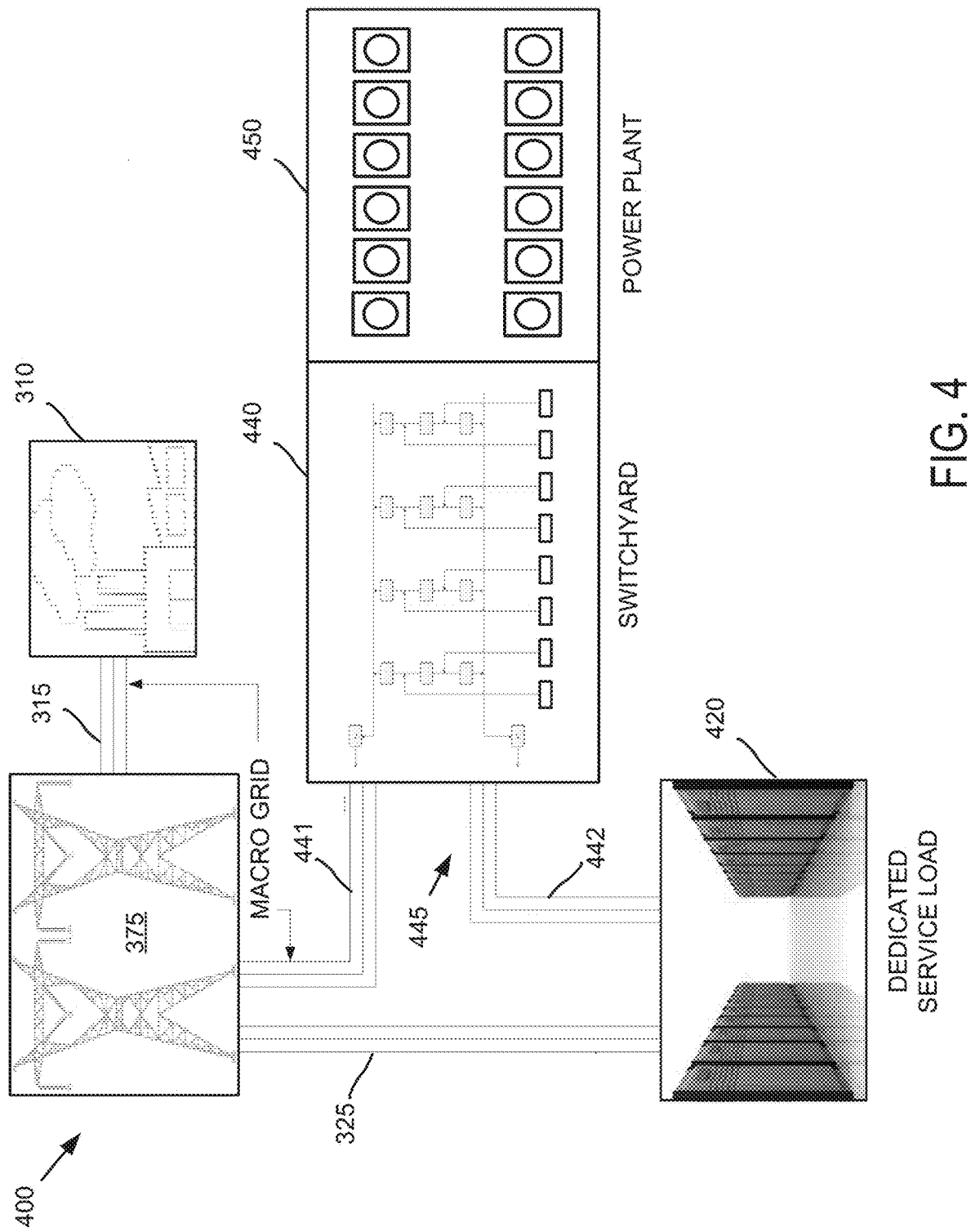
FIG. 4 illustrates an example electrical distribution system.

FIG. 4 illustrates an example electrical distribution system 400. In addition to being electrically connected to a distributed electrical grid 375 by a first transmission line 441 and/or by a first bus, a power plant 450 may also be electrically connected to a dedicated service load 420, by a second transmission line 442 and/or by a second bus associated with a dedicated electrical grid 445, or micro-grid.

Certain types of facilities that require an uninterrupted source of power may meet their energy reliability requirements through the provision of multiple power sources. For example, the facility may be situated near an additional coal or natural gas-fired power plant, or employ one or more backup sources such as diesel generators and batteries that may be brought online in the event that the primary power source fails. However, there is rapidly increasing concerns regarding the environmental impacts of coal and natural gas emissions in particular, which may significantly curtail or preclude their use for power production in the future, including their use as a redundant power source for a "mission critical facility." In some examples, a mission critical facility may require a baseline level of power that is continuously delivered or otherwise made available with a 99.99% reliability standard. Consumers of power may be willing to pay a premium for a baseline amount of electricity provided at 99.99% reliability.

A switchyard 440 associated with power plant 450 may be configured to prioritize providing power to dedicated electrical grid 445, as compared to distributed electrical grid 375. For example, power plant 450 may be configured to continuously and reliably provide a baseline or minimum level of electricity sufficient to meet the power requirements of a dedicated service load 420, which may be electrically connected to switchyard 440 via the second transmission line 442 associated with dedicated electrical grid 445. Any additional power generated by power plant 450 above and beyond the baseline level required by dedicated service load 420 may be used for on-site house loads, stored as electricity, used to desalinate ocean water, provided to one or more other consumers, transmitted over distributed electrical grid 375, used for other applications, or any combination thereof.

In some examples, an optional electrical connection to distributed electrical grid 375, such as dedicated power line 325, may be provided to dedicated service load 420. The dedicated power line 325 may be configured to provide a redundant source of power to dedicated service load 420 in the event that power plant 450 is taken off-line, e.g., in the event that dedicated service load 420 experiences a loss of power over second transmission line 442. In other examples, dedicated power line 325 may be utilized by dedicated service load 420 to provide power for non-essential services, or as a lower cost energy source. In still other examples, dedicated power line 325 may be configured to provide the primary source of power to dedicated service load 420, and dedicated electrical grid 445 may be configured to provide a redundant source of power to dedicated service load 420 in the event that distributed electrical grid 375 experiences a black-out, interruption, or other loss of power.

In the event of a LOOP, a degraded transmission grid event associated with distributed electrical grid 375, or at the discretion of the licensee/operator of power plant 450, first transmission line 441 to distributed electrical grid 375 may be opened such that electricity generated by power plant 450 may not be transmitted over first transmission line 441. In addition to providing power to dedicated service load 420 via dedicated electrical grid 445, at least a portion of the remaining power generating capacity of power plant 450 may be used maintain sufficient power to continue operating the house loads associated with power plant 450, despite an interrupted service to/from distributed electrical grid 375.

A power plant comprising a plurality of power modules, such as power modules 164 of FIG. 2, may be co-located with a convention nuclear power plant consisting of essentially one large nuclear reactor with a power generating capacity which may be equal to or greater than the power generation capacity of the multi-module power plant. The multi-module power plant may be configured to provide highly reliable power for all of the safety systems associated with the larger nuclear reactor. In some examples, dedicated service load 420 may comprise a conventional power plant associated with a relatively large nuclear reactor, e.g., approximately 1000 MWe or more.

The number of operating or online power modules, such as power modules 164 of FIG. 2, may be scaled up or scaled down according to the combined demand of dedicated service load 420 and the house loads associated with power plant 450. In some examples, additional power modules may be brought online following a LOOP event in order to provide uninterrupted power to dedicated service load 420.

The number of power modules retained online at power plant 450 may depend on the load demand of dedicated service load 420. By way of illustration, assume that power plant 450 comprises a plurality of power modules, and each power module is operable to generate approximately 50 MWe. Further assume that dedicated service load 420 is associated with a service load of 50 MWe, and that there is a relatively constant house load of 30 MWe associated with power plant 450, such that a minimum of 80 MWe may be required to satisfy the loads of both dedicated service load 420 and power plant 450. In some examples, the house load of 30 MWe associated with power plant 450 may be provided by a first power module, or service module unit (SIU), leaving approximately 20 MWe from the SMU that may be applied to the dedicated service load 420, with the remaining balance of 30 MWe required by the dedicated service load 420 being provided by a second power module. Service module units may also be variously referred to as service units in one or more examples described herein.

In examples in which the second module may be required to output less than full power, e.g., less than 50 MWe, a turbine bypass may be used to dissipate any additional power being generated by the second module which is not being used to generate electricity. Once the power demands of dedicated service load 420 and power plant 450 have been satisfied or otherwise stabilized, the power generated by the second power module may be reduced to limit the amount of steam being diverted to the condenser via the turbine bypass. In some examples, the second power module may remain in Droop mode to follow the SM.

When a LOOP occurs, the power modules generating power to satisfy the requirements of dedicated service load 420 and the house loads of power plant 450 may remain in operation. On the other hand, the additional power modules may be configured to bypass the turbine generators and dump steam directly to the condensers until distributed electrical grid 375 returns to service. The SMU may continue to provide power for the house loads while the remaining power modules remain critical and are placed in turbine generator bypass for the duration of the LOOP. Following the LOOP event in which distributed electrical grid 375 is returned to service, the power modules may be placed in cold shutdown and then brought back online with a staggered restart.

The following three cases or scenarios are described with respect to the example power distribution system 400 illustrated in FIG. 4.

Case 1

The power modules associated with power plant 450 may all be placed in cold shutdown during a LOOP event. The power plant 450 may be connected to distributed electrical grid 375, while not being connected to dedicated electrical grid 445. In some examples, one or more transmission lines associated with distributed electrical grid 375 may be closed allowing power plant 450 to receive electricity from distributed electrical grid 375, while one or more transmission lines associated with dedicated electrical grid 445 may be open such that power plant 450 and dedicated service load 420 are electrically isolated from each other.

Case 2

One power module, such as the SM, may be configured to supply power for the house loads associated with power plant 450, while the remaining power modules are critical and placed in turbine bypass during a LOOP event. The power plant 450 may be connected to dedicated electrical grid 445, while not being connected to distributed electrical grid 375. In some examples, the one or more transmission lines associated with dedicated electrical grid 445 may be closed while one or more transmission lines associated with distributed electrical grid 375 are open.

Case 3

Power plant 450 may be connected to both distributed electrical grid 375 and dedicated electrical grid 445. During a LOOP event, one or more power modules associated with power plant 450 may be configured to continue supplying electricity to dedicated electrical grid 445 while the remaining power modules are critical and placed in turbine bypass.

Multiple power module outages may occur if there is an outage in a shared secondary system. For example, as a result of the unavailability of a shared secondary system, two or more power modules may be simultaneously removed from operation. The power modules may be configured to restart in a staggered fashion, such as with a two day offset between each power module, similar to LOOP recovery. The ability to perform repair work, maintenance, or is refueling of multiple power modules may depend on the layout of the power plant, for example according to the number of cranes and repair tools.

For Case 1, the LOOP event may be assumed to remove a first power module from service for one to three days with an extra two days for each additional power module that is affected. For Case 2, the LOOP even may be assumed to remove all of the power modules from service for one to three days, after which all the power modules may be immediately returned to service. In some examples involving one or both of Cases 1 and 2, the power modules may not be available to supply power during the LOOP event.

To determine the power level that can be assured with 99.99% availability to a dedicated service load, the power modules in Case 3 may be considered to be available during a LOOP, as they are available to supply power to the dedicated service load on the micro-grid if needed, even though they may be in turbine bypass.

A power plant, such as power plant 150 illustrated in FIG. 2, was simulated for 50,000 lifetimes for each of the three Cases. Two types of results were calculated: the capacity factor of the plant and the availability of electrical output at each plant power level. The capacity factor was determined as the ratio of the total electric power output by the power plant to the maximum possible electric power that could be output by the plant over sixty years. The maximum likelihood estimate (MLE) of an example power plant capacity factor for Case 1 was determined to be 96.57% with a standard deviation of 0.30%. The corresponding 5 and 95 percentiles were 96.01% and 96.97%, respectively. The MLE of a power plant capacity factor for Case 2 was determined to be 96.67% with a standard deviation of 0.27%. The corresponding 5 and 95 percentiles were 96.17% and 97.02%, respectively. The MLE of a power plant capacity factor for Case 3 was determined to be 96.68% with a standard deviation of 0.27%. The corresponding 5 and 95 percentiles were 96.18% and 97.03%, respectively.

In some examples, the capacity factor may be larger by approximately 0.1% when the power modules are placed in turbine bypass rather than placed in cold shutdown in response to a LOOP. The difference in capacity factor is due to the small number of LOOPS that occur over the 60 years of plant operation. Although the predicted capacity factor in Case 2 and Case 3 may be higher than in Case 1, the MLE for each case is within one standard deviation of the others and the MLEs may therefore be considered equivalent.

The results for an example power plant comprising twelve power modules is provided in Table II, which lists the MLE for the number of power modules operating simultaneously for each of the three Cases. The result of 67.22% availability of all twelve modules for Case 1 may not correspond to a capacity factor of 67.22%. This is because while the power plant may be operating at 100% output 67.22% of the time, the power plant may also be operating at 92% output 26.98% of the time and 86% output 4.64% of the time and so on, increasing the overall capacity factor above the 67.22% availability result.

As shown in Table II, the power plant may spend the majority of time with all of the twelve power modules operating, with the amount of time spent with fewer operational power modules significantly declining as the number of power modules in operation decreases. Under all three cases, the number of operational power modules may be expected to fall below eight power modules no greater than 0.19% of the time. In some examples, the time spent with seven or fewer power modules in operation may be due almost solely to the probability of LOOP events.

TABLE II

Percentage of time that the power plant operates with the
indicated number of power modules producing power

| Number of Modules | Case 1 MLE | Case 2 MLE | Case 3 MLE |
|---|---|---|---|
| 12 | 67.22 | 67.35 | 67.36 |
| 11 | 26.98 | 27.01 | 27.01 |
| 10 | 4.64 | 4.63 | 4.63 |
| 9 | 0.69 | 0.68 | 0.68 |
| 8 | 0.19 | 0.17 | 0.17 |
| 7 | 0.09 | 0.07 | 0.07 |
| 6 | 0.05 | 0.03 | 0.03 |
| 5 | 0.03 | 0.01 | 0.01 |
| 4 | 0.02 | 0.01 | 0.01 |
| 3 | 0.02 | 0.01 | 0.01 |
| 2 | 0.02 | 0.01 | 0.01 |
| 1 | 0.02 | 0.01 | 0.01 |
| 0 | 0.03 | 0.02 | 0.01 |

When the consequence of a LOOP event is reduced, as in Case 2 and Case 3, the time spent with seven or fewer power modules in operation may be a factor of the probability of a failure in one of the shared systems. Occasions where five power modules may be removed from operation due to refueling, closed, or open outages is only expected to occur on the order of a few days over the entire 60 year lifespan of the power plant.

The MLEs for the probabilities that at least the indicated power level is available are presented in Table III for Case 1, in which the power modules may be placed in cold shutdown in response to a LOOP event, and the power plant may be connected to the distributed electrical grid, or macro-grid. The probability that at least 450 MWe is generated may be approximately 99% with at least nine modules operating. On the other hand, the probability of achieving power at the 99.9% level may drop to 200 MWe.

TABLE III

Probability that at least the indicated power is available
for Case 1

| Power | MLE | Std Dev | 5% | 95% |
|---|---|---|---|---|
| 600 | 67.22 | 1.21 | 65.10 | 69.05 |
| 550 | 94.19 | 1.09 | 92.19 | 95.70 |
| 500 | 98.83 | 0.66 | 97.53 | 99.58 |
| 450 | 99.52 | 0.42 | 98.68 | 99.94 |
| 400 | 99.72 | 0.28 | 99.17 | 99.98 |
| 350 | 99.80 | 0.20 | 99.43 | 99.99 |
| 300 | 99.85 | 0.16 | 99.57 | 100.00 |
| 250 | 99.88 | 0.13 | 99.65 | 100.00 |
| 200 | 99.90 | 0.10 | 99.72 | 100.00 |
| 150 | 99.93 | 0.08 | 99.79 | 100.00 |
| 100 | 99.95 | 0.05 | 99.85 | 100.00 |
| 50 | 99.97 | 0.03 | 99.92 | 100.00 |
| 0 | 100.00 | 0.00 | 100.00 | 100.00 |

By placing the power modules in cold shutdown in response to a LOOP even, a probability of 99.97% may be achieved in some examples. The LOOP events may be the limiting factor in improving this probability, as the Loop events may account for nearly 0.2% of the overall plant operational time. Permitting the power modules to enter turbine bypass in Case 2 rather than cold shutdown may result in relatively minor changes to the power reliability.

By lowering the consequence of LOOP events, the likelihood or reliability of power generation from the power plant may be increased, as shown in Table IV. For Case 2, 99.0% reliability may be achieved at 500 MWe, 99.9% reliability may be achieved at 350 MWe, and 99.98% may be achieved at 100 MWe. In some examples, the amount of time that the power plant operates with a specific number of modules generating power may not be significantly different between Case 1 and Case 2.

TABLE IV

Probability that at least the indicated power is available
for Case 2

| Power | MLE | Std Dev | 5% | 95% |
|---|---|---|---|---|
| 600 | 67.35 | 1.21 | 65.22 | 69.17 |
| 550 | 94.37 | 1.07 | 92.40 | 95.83 |
| 500 | 99.00 | 0.62 | 97.78 | 99.64 |
| 450 | 99.68 | 0.36 | 98.91 | 99.97 |
| 400 | 99.85 | 0.20 | 99.46 | 100.00 |
| 350 | 99.92 | 0.11 | 99.77 | 100.00 |
| 300 | 99.95 | 0.06 | 99.85 | 100.00 |
| 250 | 99.96 | 0.04 | 99.89 | 100.00 |
| 200 | 99.97 | 0.04 | 99.90 | 100.00 |
| 150 | 99.97 | 0.03 | 99.92 | 100.00 |
| 100 | 99.98 | 0.02 | 99.94 | 100.00 |
| 50 | 99.98 | 0.02 | 99.95 | 100.00 |
| 0 | 100.00 | 0.00 | 100.00 | 100.00 |

When a micro-grid connection is available to supply power to a dedicated service load when the macro-grid is unavailable, a power output reliability of 99.99% may still be achieved as shown in Table V. For Case 3, a 99.0% reliability may be achieved at 500 MWe, a 99.9% reliability may be achieved at 350 MWe, and a 99.99% reliability may be achieved at 100 MWe.

TABLE V

Probability that at least the indicated power is available
for Case 3

| Power | MLE | Std Dev | 5% | 95% |
|---|---|---|---|---|
| 600 | 67.36 | 1.21 | 65.23 | 69.19 |
| 550 | 94.37 | 1.07 | 92.39 | 95.84 |
| 500 | 99.01 | 0.62 | 97.76 | 99.65 |
| 450 | 99.68 | 0.36 | 98.91 | 99.98 |
| 400 | 99.86 | 0.20 | 99.46 | 100.00 |
| 350 | 99.93 | 0.11 | 99.79 | 100.00 |
| 300 | 99.96 | 0.06 | 99.87 | 100.00 |
| 250 | 99.97 | 0.04 | 99.90 | 100.00 |
| 200 | 99.98 | 0.03 | 99.92 | 100.00 |
| 150 | 99.98 | 0.02 | 99.95 | 100.00 |
| 100 | 99.99 | 0.01 | 99.96 | 100.00 |
| 50 | 99.99 | 0.01 | 99.98 | 100.00 |
| 0 | 100.00 | 0.00 | 100.00 | 100.00 |

A comparison of power reliability for all three of the Cases analyzed is provided at FIG.

In some examples, the terms dedicated electrical grid and/or micro-grid as used herein, may comprise or otherwise refer to a local switchyard, such as switchyard 440, and one or more buses and/or connections associated with power plant 450. For example, a micro-gird may be configured to allow power plant 450 to operate in island-mode, such that the house loads may be provided with sufficient power by one or modules of power plant 450, without power plant 450 (or switchyard 440) actively connected to distributed electrical grid 375. Electricity generated by power plant 450 may be routed by switchyard 440 back to power plant 450 during island mode, in order to provide power for house loads.

Additionally, the dedicated electrical grid or micro-grid may comprise one or more buses, connections, and/or transmission lines, such as second transmission line 442, configured to electrically couple power plant 450 and/or switchyard 440 to one or more dedicated service loads, such as dedicated service load 420. The dedicated service load may be located nearby or proximate to power plant 450, however in other examples the dedicated service load may be located essentially any distance from power plant 450. Accordingly, the terms dedicated electrical grid or micro-grid may not necessarily indicate the size, proximity or distance between power plant 450 and the dedicated service load. In some examples, a micro-grid may be configured to allow power plant 450 to operate in "island mode" while also providing power to dedicated service load 420 via dedicated electrical grid 445. Additionally, power plant 450 may be configured to operate in island mode without any dedicated service loads.

In some examples, a power plant that is operating at the micro-grid level may essentially be understood as being disconnected from a macro-grid, such as distributed electrical grid 375, and/or operating with electricity supplied exclusively by the power plant. Power plant 450 may be configured to provide sufficient electricity to power one or both of the house loads and the dedicated service load for an indefinite period of time, without any active connection to distributed electrical grid 375. Accordingly, a power plant which is configured to operate with a micro-grid may be understood to provide its own preferred power source, as contrasted with conventional nuclear reactors which rely upon a macro-grid as being the preferred power source.

In example configurations in which power plant 450 may be connected to distributed electrical grid 375, in addition to being connected to dedicated electrical grid 445, power plant 450 may be configured to place any electricity generated from excess power capability of power plant 450 onto distributed electrical grid 375. For example, a baseline amount of power may be reserved or utilized for house loads and the one or more dedicated service loads that require a continuous and uninterrupted source of power, and any power in excess of the baseline amount may be sent to distributed electrical grid 375. This excess power may fluctuate according to the number of power modules which are operating and, in some examples, may comprise all of the power modules other than one or more service module units.

In some examples, excess power generated by power plant 450 may be used to provide electricity for operations associated with desalination, coal drying, power storage, other alternate operations, or any combination thereof. These alternate operations may be considered non-critical, in that the systems do not necessarily require continuous and uninterrupted power. Rather, the desalination, drying, and storage operations can be intermittently stopped and restarted without much economic consequence or disruption of services. The non-critical systems may or may not be electrically connected to the macro-grid.

In the event of the loss of electrical connectivity to distributed electrical grid 375, power plant 450 may be configured to take certain remedial steps to account for the loss of power destinations. As discussed immediately above, some power may be diverted to one or more alternate operations such as desalination, coal drying, and/or power storage in the event of the loss of distributed electrical grid 375. In other examples, one or more power modules may be placed on turbine bypass to effectively dissipate the excess power being generated by power plant 450.

In some examples, power plant 450 may respond to the loss of distributed electrical grid 375 by reducing the output capacity of some or all of the power modules. The overall output capacity associated with the plurality of power modules may be reduced to a baseline power level that equals the power requirements of the house loads and/or the dedicated service loads. Additionally, the overall output capacity may be reduced through turbine-bypass, partially inserting control rods, taking one or more power modules off-line, shutting down one or more power modules, other remedial operations, or any combination thereof.

In responding to the loss of distributed electrical grid 375, power plant 450 may be configured to maintain one or more service module units at full operating capacity, and the output capacity of the remaining non-service module units may be reduced. When more than one power module has been identified as a service module, a governor may be configured to assist in the communication and coordination of load sharing and voltage regulation between the service module units which may both be operating in isochronous mode (e.g., isochronous load sharing). The non-service module units may be maintained at the reduced output capacity for a period of time, such that they could be quickly brought back up to full output capacity when the connection to distributed electrical grid 375 is restored.

Power plant 450 may therefore be configured to provide a continuous and essentially uninterrupted level of baseline power, with a high degree of reliability that may not be replicated by a conventional power plant having a single nuclear reactor. Additionally, the baseline power may be a fraction (e.g., less than 50%) of the maximum output capacity of power plant 450. Power plant 450 may be configured to continue operating at a reduced, baseline power level for an indefinite period of time. On the other hand, conventional power plants comprising a single reactor may not be particularly well suited to operating at a reduced output capacity for an extended period of time, as this may result in feedwater oscillations and/or other types of events which can lead to a reactor trip in conventional power plants.

In some examples, some or all of the power modules associated with power plant 450 is may be configured to operate at a reduced output capacity (e.g., with a derated core) in order to prolong the life of the fuel, while also providing the flexibility to individually vary the power level of each power module in order to maintain the baseline output capacity of power plant 450. For example, twelve power modules operating at 50% output capacity may be configured to generate 300 MWe. In the event that half of the power modules may be taken offline, the power output of the remaining six modules may be quickly ramped up to the maximum output capacity of 50 MWe per power module, in order to maintain the overall power plant baseline power of 300 MWe.

Figure 5:
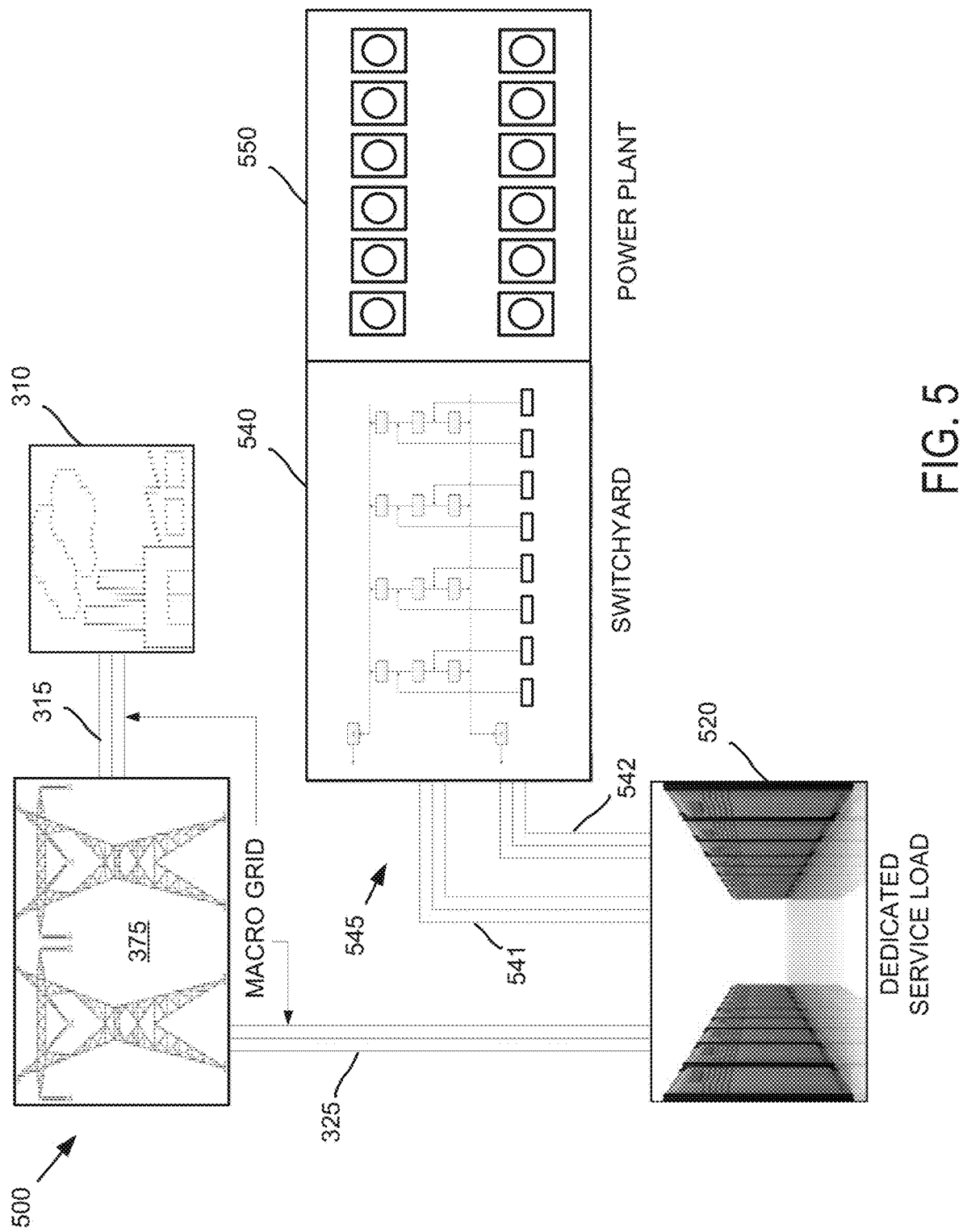
FIG. 5 illustrates another example electrical distribution system.

FIG. 5 illustrates another example electrical distribution system 500. Instead of being electrically connected to a dedicated electrical grid of electrical distribution system 500, power plant 550 may be electrically connected to a local dedicated service load 520 by a dedicated electrical grid 545, or micro-grid, comprising a double bus configuration. For example, the double bus configuration may comprise a first transmission line 541, which may include a first bus, and a second transmission line 542, which may include a second bus. A double bus configuration may increase the reliability that at least one of the transmission lines 541, 542 is available to transfer electricity from power plant 450 to dedicated service load 520 in the event that the other transmission line and/or bus associated with dedicated electrical grid 545 experiences a failure.

A switchyard 540 associated with power plant 550 may be configured to prioritize providing power to dedicated service load 520, via first transmission line 541 and/or second transmission line 542. For example, power plant 550 may be configured to continuously and reliably provide a baseline or minimum level of electricity over one or both transmission lines 541, 542 sufficient to meet the power requirements of dedicated service load 520. Any additional power generated by power plant 550 above and beyond the baseline level required by dedicated service load 520 may be used for on-site house loads, stored as electricity, used to desalinate ocean water, provided to one or more other consumers, used for other applications, or any combination thereof.

In some examples an optional connection, such as dedicated power line 325, may be configured to connect dedicated service load 520 to distributed electrical grid 375. The dedicated power line 325 may be configured to provide a redundant source of power to dedicated service load 520 in the event that power plant 550 is taken off-line; e.g., in the event that dedicated service load 520 experiences a loss of power over dedicated electrical grid 545. In other examples, dedicated power line 325 may be utilized by second customer 325 to provide power for non-essential services, or as a lower cost energy source. In still other examples, dedicated power line 325 may be configured to provide the primary source of power to dedicated service load 520, and one or both of first transmission line 541 and second transmission line 542 may be configured to provide a redundant source of power to dedicated service load 520 in the event that distributed electrical grid 375 experiences a black-out or other loss of power.

In addition to providing power to dedicated service load 520 via one or both of first transmission line 541 and second transmission line 542, at least a portion of the remaining power generating capacity of power plant 550 may be used maintain sufficient power to continuously operate the house loads associated with power plant 550. In some examples, power plant 550 may be sited at a location where there is no transmission grid connection available or where connection to a distributed electrical grid is undesirable. Accordingly, power plant 550 may be substantially self-reliant on power generated or stored on-site, whether through continuous operation of one or more power modules, or by use of an auxiliary power source such as a diesel generator or a battery when construction of power plant 550 has been completed and the first power module is initially brought online.

In some configurations, the example power plant 550 and/or switchyard 540 may be understood to operate similarly as the example power plant 450 and/or switchyard 440 of FIG. 4. For example, a first power module or SMU associated with power plant 550 may be configured as the primary power source in locally maintaining the power plant's voltage and frequency (e.g., during an isochronous mode) with other modules running in parallel (e.g. in a droop mode) to the SMU to provide the power output to one or both of the dedicated service load 520 and the house loads associated with the power plant 550.

In some examples, different plant responses to a LOOP may be understood as having a relatively insignificant effect on single plant capacity factor. However, the manner in which the power plant is configured to connect to the macro-grid and micro-grid when taken together with the power plant's response to a LOOP event may have a substantial effect on power output reliability. For example, by placing one or more of the power modules in cold shutdown in response to a LOOP, a gross plant output of 200 MWe may be provided at a reliability of 99.9%. In contrast, by placing the modules in turbine bypass, a reliability of 99.9% may be obtained for providing a gross plant output of 350 MWe, or an approximately 75% increase in capacity. Additionally, a higher level of reliability of 99.99% can be assured at some baseline power level, such as 100 MWe, if the power plant has a micro-grid connection to the dedicated service load.

In some examples, the capacity factor associated with an example power plant may remain essentially constant, for example approximately 96.6%, regardless of the type of power plant connection to the distributed electrical grid and regardless of the power plant responses to a LOOP event. In contrast to traditional power plants comprising a single large reactor, and in which there may effectively be no baseline level of power which is assured, one or more of the example multi-module power plants disclosed herein may be able to provide approximately 50% of the total plant capacity at 99.9% reliability and 17% of total plant capacity at 99.99% reliability.

Figure 6:
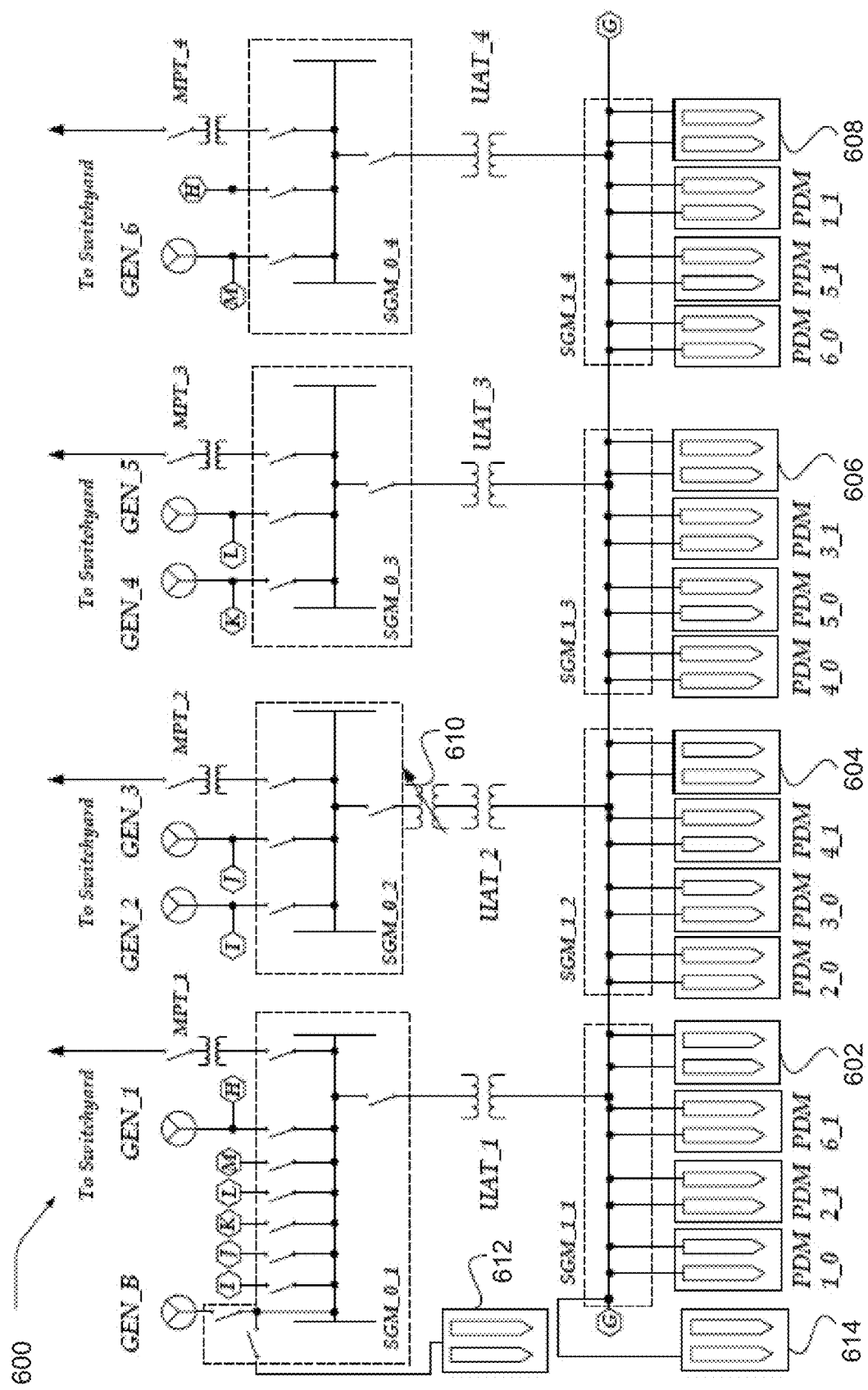
FIG. 6 illustrates a schematic diagram for an example power distribution system.

Some of the analysis described herein utilized MATLAB and included probability distributions for the frequency and duration of module outages due to planned and unplanned events. The analysis also evaluated the impact of implementing turbine bypass rather than cold shutdown and using one or more modules to supply house loads in the case of loss of offsite power. Although reliability results are presented for a twelve-module RAIR power plant, both with and without turbine bypass during a loss of offsite power enabled, other configurations and number of modules may be analyzed in a similar manner. Results of the analysis indicate that a very high level of reliability can be achieved at relatively high power output levels, especially when turbine bypass is enabled in a multi-module power plant, and when the power plant is configured with a direct connection to the dedicated service load, FIG. 6 illustrates a schematic diagram for an example power distribution system 600 configured to distribute locally generated power for the operation of a power plant. In some examples, a second portion of a fault-tolerant power distribution system may be similarly configured for the operation of a power plant that includes twelve modular generators.

Power distribution system 600 may be directed towards the upper six PM assemblies and upper six generators of power plant 150 of FIG. 2. The system may comprise a fault tolerant system with redundant power transmission paths, PDMs main power transformers (MPTs), and unit auxiliary transformers (UATs).

Power distribution system 600 may comprise six generators: GEN_1, GEN_2, GEN_3, GEN_4, GEN_5, and GEN_6. Each of the six generators may be selectively coupled to at least two of four front-end switchgear modules (SGM): SGM_0_1 SGM_0_2, SGM_0_3, and SGM_4. A separate main power transformer (MPT) may be selectively coupled to one of the four front-end switchgear modules to redundantly provide power to the switchyard. Portion 400 may also comprise a corresponding backend switchgear module for each of the four front-end modules: SGM_1_1, SGM_1_2, SGM_1_3, and SGM_1_4. Each front-end switchgear module may be coupled to the corresponding backend switchgear module via cable bus modules and a corresponding unit auxiliary transformer: UAT_1, UAT_2, UAT_3, and UAT_4. As shown in FIG. 6, a voltage regulating transformer 210 may be used in combination with one or more of the UATs.

Power distribution system 600 may comprise a power-distribution module for each of the six generators. Each of the six power-distribution modules may comprise at least two redundant power-distribution modules feeds. Each of power-distribution module feeds PDM_1_0 and PDM_1_1 may be configured to provide power to the power-distribution module that corresponds to GEN_1. Each of power-distribution module feeds PDM_2_0 and PDM_2_1 may be configured to provide power to the power-distribution module that corresponds to GEN_2. Each of power-distribution module feeds PDM_3_0 and PDM_3_1 may be configured to provide power to the power-distribution module that corresponds to GEN_3. Each of power-distribution module feeds PDM_4_0 and PDM_4_1 may be configured to provide power to the power-distribution module that corresponds to GEN_4. Each of power-distribution module feeds PDM_5_0 and PDM_5_1 may be configured to provide power to the power-distribution module that corresponds to GEN_5. Additionally, each of power-distribution module feeds PDM_6_0 and PDM_6_1 may be configured to provide power to the power-distribution module that corresponds to GEN_6.

Some or all of these redundant power-distribution module feeds may be coupled to the outputs of one of four backend switchgear modules: SGM_1_1, SGM_1_2, SGM_1_3, and SGM_1_4. The system may comprise a fault tolerant system with redundant power transmission paths, power-distribution module feeds, main power transformers (MPTs), and unit auxiliary transformers (UATs) for each of the generators.

The system may include one or more backup generators (GEN_B). In some examples, the voltage output of GEN_B may be approximately 13.8 kVAC. GEN_B may be coupled to feed 612 through one or more switches. GEN_B may also be coupled to one or more of the front-end switchgear modules: SGM_0_1, SGM_0_2, SGM_0_3, SGM_0_4, SGM_0_5, and SGM_0_6 through one or more switches. GEN_B may be employed to provide power to the power plant in the event that one or more of the PGM assemblies and/or corresponding generators is unavailable for power generation. A first feed 212 corresponding to GEN_B may be selectively coupled to at least one of the front-end modules, such as but not limited to SGM_0_1. A second feed 212 corresponding to GEN_B may be selectively coupled to one of the backend modules, such as but not limited to SGM_1_1.

In some examples, one or more other backup generators may be configured provide an AC signal to the one or more of the PDMS at a lower voltage than the AC signals generated by GEN_B. For instance, GEN_B may generate a 13.8 kV AC signal, while the one or more generators that provide power to the PDMs may generate a 480 V AXC signal.

The system may include additional power-distribution module feeds coupled to one or more of the backend switchgear modules. For instance, power-distribution module feeds 602, 604, 606, and 608 may provide power to other power-distribution modules that distribute power to loads that are common to each of the six generators included in power distribution system 600. The power-distribution modules that are provided power by power-distribution module feeds 602, 604, 606, and 608 may be common-plant PDMs. Accordingly, feeds 602, 604, 606, and 608 may be common-plant feeds. Power-distribution module feeds 602, 604, 606, and 608 may provide power to power-distribution modules for various common pumps and motors included in the power plant.

Each of the various power-distribution modules may distribute power in real time. Furthermore, the one or more of the power-distribution modules may include one or more charging modules to charge one or more batteries that store power for later use. Feed 612 corresponds to GEN_B may be coupled to one or more of the front-end switchgear modules. Feed 614 may be coupled to one or more of the backend switchgear module.

Island Mode

Under the provisions of Title 10, Section 50.34, of the Code of Federal Regulations (10 CFR 50.34), the United States Nuclear Regulatory Commission (NRC) has established principal design criteria that must be met for a proposed nuclear power plant facility. According to Criterion 17 of 10 CFR 50.34, "An onsite electric power system and an offsite electric power system shall be provided to permit functioning of structures, systems, and components important to safety. The safety function for each system (assuming the other system is not functioning) shall be to provide sufficient capacity and capability to assure that (1) specified acceptable fuel design limits and design conditions of the reactor coolant pressure boundary are not exceeded as a result of anticipated operational occurrences and (2) the core is cooled and containment integrity and other vital functions are maintained in the event of postulated accidents."

Criterion 17 goes on to describe that "The onsite electric power supplies, including the batteries, and the onsite electric distribution system, shall have sufficient independence, redundancy, and testability to perform their safety functions assuming a single failure."

Additionally, Criterion 17 of 10 CFR 50.34 requires that "Electric power from the transmission network to the onsite electric distribution system shall be supplied by two physically independent circuits (not necessarily on separate rights of way) designed and located so as to minimize to the extent practical the likelihood of their simultaneous failure under operating and postulated accident and environmental conditions. A switchyard common to both circuits is acceptable. Each of these circuits shall be designed to be available in sufficient time following a loss of all onsite alternating current power supplies and the other offsite electric power circuit, to assure that specified acceptable fuel design limits and design conditions of the reactor coolant pressure boundary are not exceeded. One of these circuits shall be designed to be available within a few seconds following a loss-of-coolant accident to assure that core cooling, containment integrity, and other vital safety functions are maintained."

The distributed electrical grid or macro-grid may be understood to refer to an electrical transmission and distribution system which may be connected to multiple power generation sources to service a plurality of distributed consumers. In the nuclear industry, the macro-grid may be described as the "preferred power source" for conventional power plant configurations, such that the macro-grid may primarily be relied upon to provide the power necessary to achieve safety functions. Criterion 17 is the primary means by which conventional power plants have implemented the preferred power source concept. That is, the NRC requirements associated with Criterion 17 have been the backstop to assure the power necessary to achieve safety functions is available.

A LOOP may be considered a significant event for a conventional power plant as it represents the loss of the preferred power supply. That is, the power supply normally required to achieve safety functions may be unavailable from the macro-grid. While a main generator may be configured as an on-site source of AC power for the power plant, the main generator may nevertheless trip due to the loss of a significant portion of the load.

In the event of a main generator failure, the next sources of on-site AC power for achieving safety functions that may be relied upon by the power plant may be an emergency diesel generator (EDG). If the EDG fails in a conventional power plant, a station blackout may occur. The combination of a LOOP, the loss of the main generator, and the failure of the EDGs occurred at Fukushima. Conventional power plants may only be able to maintain operation of the safety functions, or otherwise compensate for the loss of safety functions, for a few hours once the EDG has failed. For example, the ability of the power plant to continue operating in a controlled manner after the EDG fails may be limited to the stored energy of the station batteries, which may only provide four to eight hours of operation.

The Auxiliary AC Power Source (AAPS) may comprise a combustion turbine generator, a hydroelectric power plant, or some other auxiliary power source that may be configured to supply backup power to the permanent non-safety loads upon loss of normal AC power sources, such as the loss of power from all power modules and any offsite power source.

The AAPS may be configured to achieve two primary functions. A first primary function of the AAPS may include providing an onsite AC power source to transition from a trip situation where decay heat removal has been initiated to a mode that allows decay heat to be moved to the normal heat sink via condensate and feed and the circulating water system to the cooling towers. A second primary function of the AAPS may include providing an onsite AC source to enable the black start capability.

In a power plant comprising a plurality of relatively small power modules, such as power plant 150 (FIG. 2), the AAPS may be configured to black start a single power module, such as power module 100 (FIG. 1). The amount of electricity required to start a power module associated with power output of approximately 50 MWe may be significantly less than that associated with starting a conventional reactor that may be associated with 1000 IV We or more. Once the first power module has been started, the power generated by the first power module may be used to power house loads and/or to black start additional power modules associated with power plant 150. Accordingly, the AAPS associated with power plant 150 may be sized considerably smaller than what would be required for a conventional power plant to provide the black start.

In some examples, the AAPS may comprise a combustion turbine generator similar to that used for providing peaking loads in some types of power systems. In conventional power plants, the combustion turbine generator may be placed in spinning reserve during peak periods of demand for electricity, such as in the summer due to the increase use of air conditioning.

For a power plant such as power plant 150, by having a plurality of power modules 160 which may be configured to load follow much more efficiently than conventionally sized power plants, the combustion turbine generator may not be required for peaking loads. Nevertheless, for power plant 150 a similarly sized combustion turbine generator as conventionally used for peaking loads may instead be used to black start the power plant. The combustion turbine generator for power plant 150 would not, however, need to be placed in spinning reserve in order to provide power for the black start.

As discussed above, island mode is a term that may be used to describe operation of a power generating facility independent of any connection to a distributed electrical grid, or macro-grid, using electricity generated on-site from one or more power modules. Conventional nuclear power plants have effectively been prohibited from being configured to operate in island mode due to their dependence on the macro-grid as the preferred power supply to achieve safety functions, according to Criterion 17 of 10 CFR 50.34.

The AAPS may be used as a stabilizing source during island mode (IM) transition and/or dedicated service mode (DSM) operation to absorb rapid load changes, similar to their use in the industry as peaking units. Accordingly, when irregularities in the distributed electrical grid are detected, the AAPS may be configured to run in standby mode as a hedge against a LOOP event, for example the AAPS may be used as a spinning reserve unit.

Configuring a power plant to operate in island mode may minimize the probability of losing electric power from any of the remaining supplies as a result of, or coincident with, the loss of power generated by the nuclear power unit, the loss of power from the macro-grid transmission network, or the loss of power from onsite electric power supplies.

In a power plant comprising one or more reactor modules such as reactor module 100 of FIG. 1, the power plant may be configured to achieve safety functions through passive means, such as systems which rely only upon the laws of nature such as gravity or natural circulation. Accordingly, for a power plant such as power plant 150 of FIG. 2, electrical power may not be considered essential or even relied upon, to achieve safety functions, such that the macro-grid may be considered to be merely a load. A power plant that may be configured to operate in island mode may substantially obviate or at least re-characterize a LOOP event, such that the LOOP may more accurately be described as a loss of load event.

Additionally, reactor module 100 and power plant 150 illustrated in FIG. 2 may not require a preferred power source in the conventional sense, as the term may essentially cease to have any significant meaning for a multi-modular power plant such as power plant 150. For a power plant which includes a plurality of reactor modules and associated systems, it would take the loss of all the main generators to result in a loss of all AC power. Nevertheless, in the event of the loss of all AC power, a power plant such as power plant 150 may be configured to automatically continue operating all safety functions without reliance on AC power for an indefinite period of time, in some examples, a loss of all AC power may initiate a pre-emptive non-safety actuation of reactor scram, DHR and/or containment isolation.

Removing the reliance on the macro-grid connection allows the power plant to be sited at locations where the distributed electrical grid or macro-grid is not available, or where the grid reliability is less than what normally would be required for siting and operation of a conventional power plant. Whereas a connection to the macro-grid may provide an optional pathway to deliver or otherwise provide power from the power plant to grid based customers, such as a commercial load or a dedicated load, the connection to the macro-grid may not be required to operate safety functions or otherwise comply with regulatory requirements. By effectively removing the reliance upon a connection to the macro-grid, the power plant may be sited and operated in a number of configurations which may not have been practical or permissible for conventional power plants.

By way of illustration, three example power plant configurations or modes of operation are described below for responding to a loss of connection to a macro-grid and/or a loss of connection to a dedicated electrical grid, or micro-grid. The three power plant configurations and/or modes of operation may have different design, operational, and regulatory implications in providing a range of plant operating configurations that address the possibility of the loss of one or more distributed electrical grid connections. Some or all three example modes of operation may be understood as configuring the power plant to operate in island mode.

In a first power plant mode of operation, upon the loss of one or more distributed electrical grid connections, the power plant may be configured to SCRAM all of the operating power modules, in addition to starting and loading the backup diesel generators (BDSs) and Auxiliary AC Power Source (AAPS). Additionally, the power plant may be configured to use electrical power generated by the AAPS to black start one or more power modules. The one or more power modules may be referred to as the service module units (SMU). The SMU may be operated in island mode until one or more of the grid connections are restored.

In a second power plant mode of operation, upon the loss of one or more distributed electrical grid connections, the power plant may be configured to SCRAM all of the operating power modules except for the SM, which may maintained in operation for uninterrupted electrical power generation in island mode until the one or more grid connections are restored. Additionally, the power plant may be configured to start and use the AAPS in parallel to provide load following.

In a third power plant mode of operation, upon the loss of one or more distributed electrical grid connections, the power plant may be configured to disconnect one or more non-service power modules from the electrical system using steam bypass, maintain the non-service power modules in hot standby, or perform controlled shutdown of the non-service power modules using a power conversion system. The SMU may be maintained in operation for uninterrupted electrical power generation in island mode until the one or more grid connections are restored. Additionally, the power plant may be configured to start and use the AAPS in parallel to provide load following.

With at least one power module online and generating electrical power, the operating main turbine generator(s) associated with the online power modules may continue to provide power to the power plant (e.g., to provide power to the house loads), irrespective of the availability of power from the distributed electrical grid. In some examples, the house loads for the entire power plant may be less than the output of one of the power modules. In the event of a loss of connection to off-site power, one or more power modules, or service module units, may be used to provide uninterrupted electrical power sufficient to power all the house loads. In some examples, the power level associated with the operating power modules other than the service module units may be decreased in order to reduce the load on the condensers, while at the same time maintaining them ready to return to service.

As discussed above, one or more of the power modules may be designated as service module units (SMU). The SMU may be selected based on conditions that influence reliability and availability such as the time of in core life, the status of the associated support systems, planned maintenance, the amount of run time post re-fueling, other power module conditions, or any combination thereof. The SMU designation may be changed from power module to power module at various predetermined time intervals or unscheduled events. For example, the SMU designation may be applied to the power module which has most recently been refueled and achieved one hundred days of operation. The SMU designation may be achieved via logic selection within the voltage regulators.

When the power plant is operating independent of the macro-grid, the power plant may be configured to operate in island mode without any assistance from the AAPS, backup diesel generators, batteries, or other auxiliary power sources, to provide electrical power to the house loads associated with the power plant.

During a LOOP event in which there is a loss of connection to the offsite transmission grid or macro-grid, one or more generators associated with the SMU may transition from running in parallel with the macro-grid to running in a stand-alone mode, or island mode. This transition may be configured to change the way that frequency and voltage are controlled by the generator. For example, the generator may transition from Droop mode to Isochronous mode. In island mode, the SMU may be configured to control the voltage and frequency levels of the power plant.

The generators associated with power modules other than the SMU may be disconnected from the electrical system and the start-up process for the AAPS may be simultaneously initiated. Once the AAPS is again made available it may be paralleled to the SMU generator. In some examples, the AAPS may be primarily responsible for following plant loads so that the power generated by the SMU may be stabilized to provide a baseline load.

If the interruption in distributed electrical grid connectivity is temporary and restoration is anticipated to be near term, the non-SMU power modules may be maintained at high power on bypass steam to support a rapid return to electrical production once the connection is restored. On the other hand, if a near-term connection to the grid appears to be unlikely, the power output of the non-SMU power modules may be decreased to reduce the load on the associated condensers and save fuel. The non-SMU power modules may nevertheless be kept critical and ready to return to service without requiring a lengthy reactor startup. If the outage appears to be a long term situation, all or nearly all of the non-SMU power modules may be shutdown.

When the distributed electrical grid connection becomes available again, the SMU may be synchronized to the distributed electrical grid and control of the associated generators may be returned to parallel. Additionally, the AAPS may be shut down and the remaining non-SMU power modules may be returned to full active service by synchronizing the power modules to the distributed electrical grid and restoring their power as necessary.

In some examples, the power plant may be configured to intentionally or preemptively disconnect from the macro-grid. The macro-grid may be subject to various current and/or voltage irregularities, such as a power surge, degraded voltage, voltage spikes, frequency variation, other types of grid irregularities, or any combination thereof. In some power systems, one or more devices may be placed in the switchyard or at some other position within the power distribution system 400 in order to mitigate the effects of the grid irregularities. A circuit breaker may be triggered in the event of a voltage spike in order to protect components and systems of the power plant. In some examples, the circuit breakers may be located at one or more buses, such as first transmission 441 associated with switchyard 440 (FIG. 4)

However, rather than accommodating or compensating for such grid irregularities, in some examples, the power plant may be configured to simply disconnect from the macro-grid at any time such irregularity is detected or anticipated. For example, one or more monitoring devices may be provided in the switchyard of the power plant that would be configured to disconnect the power plant from the macro-grid before the grid irregularity reached any component or system that could be damaged or otherwise impacted. A power plant configured to operate in island mode, may continue operating even when disconnected from the macro-grid, since the power plant is not reliant upon the electricity provided by the macro-grid.

In some examples, the connection between the power plant and the macro-grid may be configured such that only electricity generated by the power plant is allowed to go through the connection, in an outbound direction to the macro-grid. Electricity that is already being transported on the macro-grid may be precluded from being transferred to the power plant, along with any accompanying grid irregularities. A one-way electrical connection may be configured to substantially isolate the power plant from the grid irregularities and/or any other issues that may arise on the macro-grid side of the connection. In some examples, the connection may be configurable such that electricity from the macro-grid could be selectively allowed to be used by the power plant during a finite period of time, such as during reactor start up.

A power plant which is configured to operate in island mode may therefore have certain advantages over a conventional power plant in which a LOOP event may result in an automatic reactor trip, and which may further result in the complete loss of ability by the conventional power plant to generate power on-site until the reactor can be restarted.

As discussed above, a power plant that is configured to operate independent of a distributed electrical grid connection (e.g., island mode) may have an onsite AC electrical generating source capable of powering site loads when no power modules are operating For example, the AC power source may be configured to power the loads associated with black starting a power module. An AAPS configured to operate as the onsite AC power generating source may be sized to black start a single power module without support from any offsite power sources.

The ability to operate in island mode or black start the power plant may be understood to exist independently of, or in isolation from, any operations which may otherwise be associated with the safety systems of the power plant. While the island mode and/or black start modes of operation may be understood to enhance the power plant's ability to provide insulation from grid reliability issues and/or service to load applications, these modes of operation do not need to be relied upon to power the passive safety systems of the power plant. However, in addition to providing commercial and operational advantages, island mode and/or black start modes of operation may be understood to provide additional power plant operational features.

10 CFR 50.65, entitled "Requirements for Monitoring the Effectiveness of Maintenance at Nuclear Power Plants," came about largely as a result of the number of maintenance-based reactor trips and safety system actuations that were occurring in industry. These occurrences were considered by the NRC to be unnecessary challenges to safety systems, introducing transients on the plant systems. In some power plants, a non-safety related reactor trip may challenge more than thirty safety related functions. However, these challenges to the power plant may be mitigated by maintaining uninterrupted AC power to site electrical loads.

In some examples, any one of the reactor modules 164 illustrated in FIG. 2 may be configured provide all the power necessary to preclude the loss of all AC power to the power plant and also preclude the unintentional actuation of the associated power system. Additionally, by providing a plurality of AC power sources on site, any one of the reactor modules 164 may be used to restore AC power to the power plant in beyond design basis events, which may provide an additional layer of defense by reducing the unnecessary actuations of safety systems.

Figure 7:
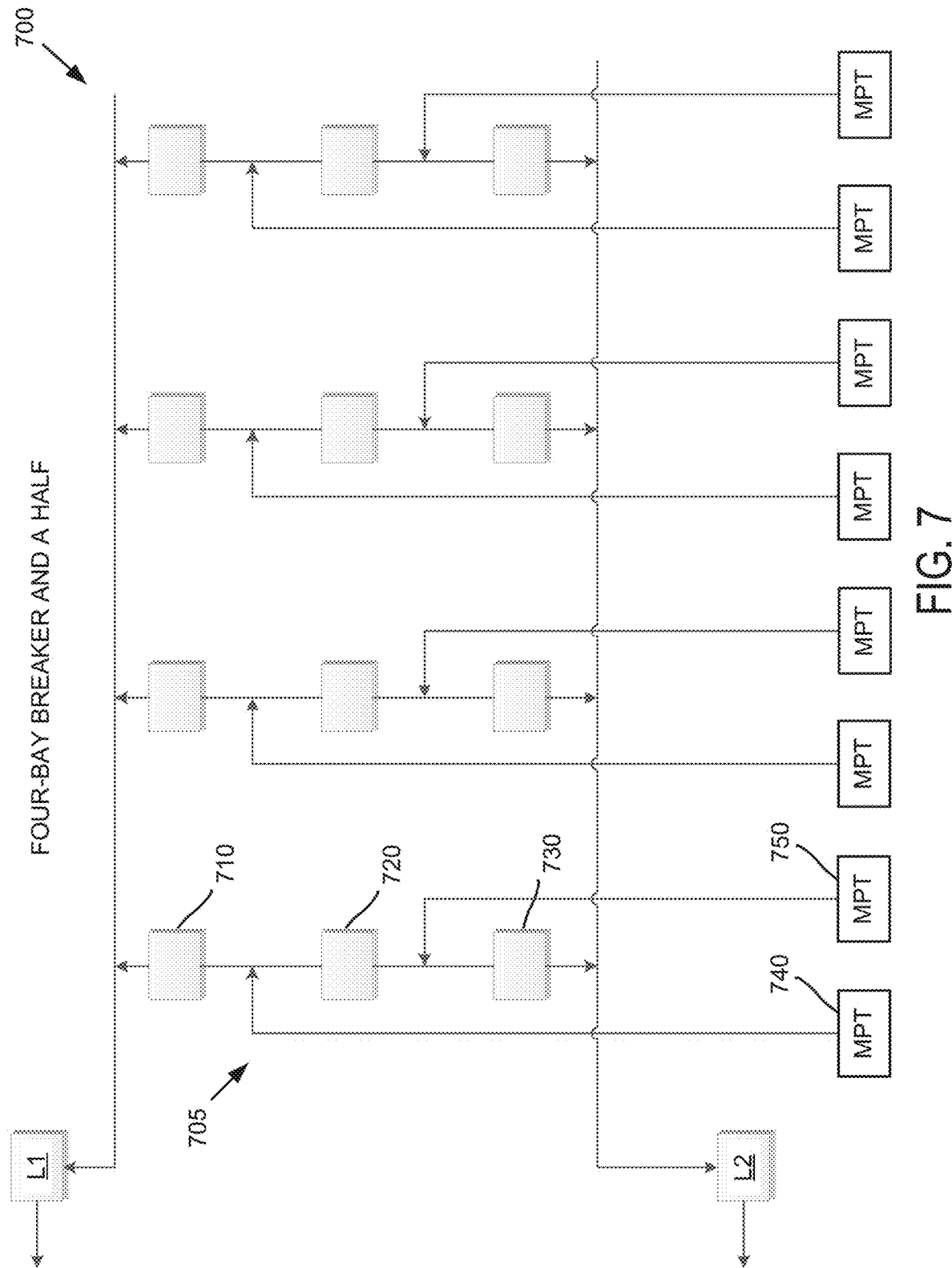
FIG. 7 illustrates a switchyard configuration for an example power distribution system.

FIG. 7 illustrates a switchyard configuration for an example power distribution system 700. In some examples, the switchyard configuration may be understood to comprise a four-bay breaker and a half switchyard scheme. A first bay 705 may be associated with a plurality of breakers, such as a first breaker 710, a second breaker 720, and a third breaker 730. The is plurality of breakers may be electrically connected to one or more main power transforms (MPT), such as a first MPT 740 and a second MPT 750.

First bay 705 may be utilized to electrically connect one or both of first MPT 740 and second MPT 750 to the distributed electrical grid via a double bus configuration. The double bus configuration is illustrated as comprising a first bus L1 and a second bus L2. This is a highly used reliable configuration in the power industry. Power distribution system 700 may provide a plurality of connections to the distributed electrical grid from the plurality of MPTs. In some examples, the number of connections may equal the number of MPTs. Additionally, power distribution system 700 may comprise one or more offsite connections to the switchyard to carry the power plant output to the distributed electrical grid or to a dedicated service load customer.

In power plants comprising a plurality of power modules, one or more additional bays may be configured similarly as first bay 705. The example switchyard configuration for power distribution system 700 illustrates four bays, and each bay may be associated with three power modules operably coupled with two MPTs, for a total of twelve reactor modules and eight MPTS.

Figure 8:
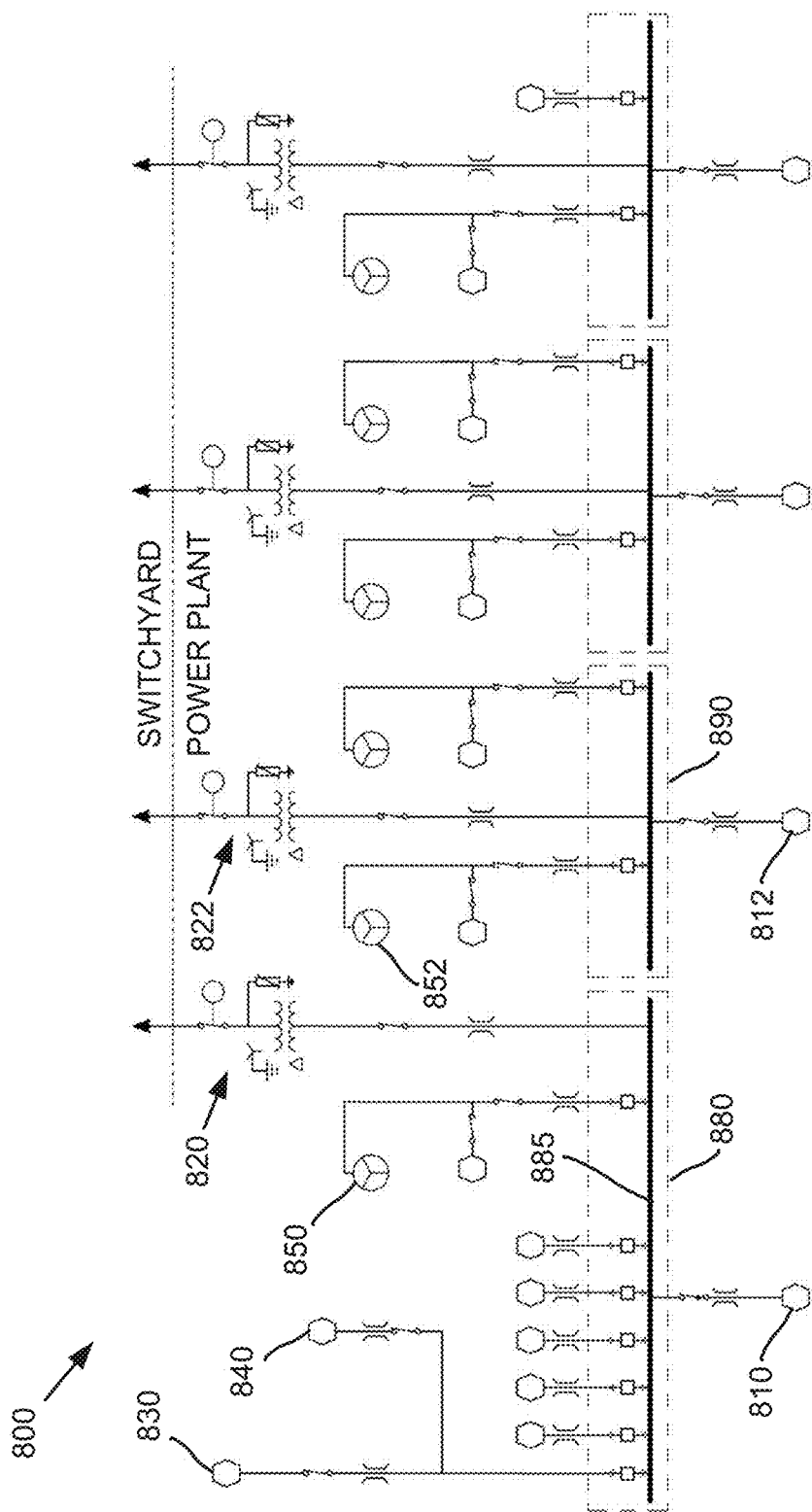
FIG. 8 illustrates an example configuration for a power distribution system.

FIG. 8 illustrates an example configuration for a power distribution system 800. The example power distribution system 800 may be understood as being configured for operation with six power modules. In power plants comprising a plurality of power modules, such as twelve power modules, power distribution system 800 may additionally be understood as comprising a substantially identical multi-module configuration for six more power modules. Cross connection between multi-module configurations may be provided by one or more buses, such as connection bus 840, for purposes of feeding either side from an AAPS 830.

Power distribution system 800 may comprise a first switchgear configuration 880. In some examples, first switchgear configuration 880 may be configured to operate with a high voltage bus 885 at approximately 13.8 kilo-volts (kv). Additionally, a main turbine 850 may be associated with the 13.8 kv bus 885, which in turn may be configured to provide power to both an associated MPT 820 and an UAT 810.

A second switchgear configuration 890 may be associated with a second main turbine 852, a second MPT 822, and a second UAT 812. In some examples power distribution systems comprising twelve power modules, there may be eight or more busses, eight or more MPTs and eight or more UATs.

UAT 810 may be configured to step the generator terminal voltage down to 4.16 kv for house loads. Additionally, MPT 820 may be configured to step the generator terminal voltage up to local grid voltage for transmission. In some examples, the grid voltage may be assumed to be approximately 345 kv. Combined with an example breaker and a half switchyard scheme such as that described with respect to FIG. 7, power distribution system 800 may be configured to provide significant flexibility and minimize the probability of a loss of all AC power.

Power distribution system 800 may be configured to allow for selective plant maintenance of one or more power modules while the remaining power modules and associated systems continue to operate and produce electricity. Accordingly, there may be no need to purchase electricity or otherwise receive electricity from the macro-grid during any maintenance activity. Additionally, maintenance may be performed on a generator, a transform, or other types of components and systems, without taking the entire power plant off-line.

The power output from multiple MPTs may be selectively applied and/or combined to power various loads. In some examples, one or more of the systems or components of the power plant may be shared as between two or more power modules.

Figure 9:
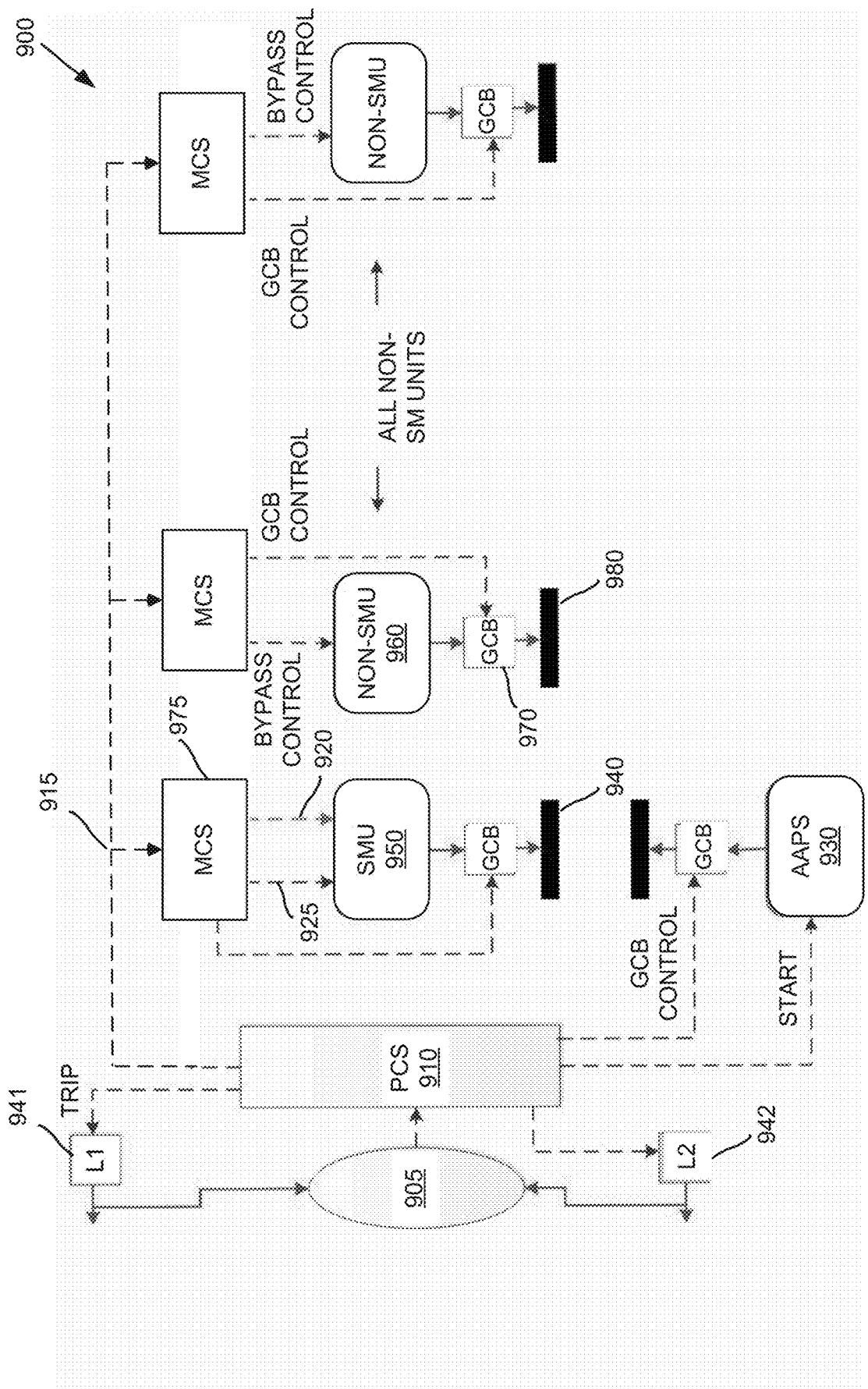
FIG. 9 illustrates an example control sequence for a power distribution system.

FIG. 9 illustrates an example control sequence for a power distribution system 900. In some examples, power distribution system 900 may be configured for local onsite distribution of power using a flexible switchyard configuration, such as one or more of the configurations illustrated in FIGS. 3-5. The initiating criteria for transitioning to island mode operation may comprise the detection of degraded voltage 905 or the loss of the distributed electrical grid.

Upon sensing a degraded voltage 905, an under-voltage sensing circuitry may be configured to open the breakers connecting the distributed electrical grid to a first bus 941 and a second bus 942. Additionally, the circuitry may be configured to send a signal 916 to a module control system (MCS) 975 to switch the service module unit 950 from Droop control to Isochronous control 920, and to initiate a partial turbine bypass 925 to supply house loads. MCS 975 may comprise one or more control devices and in some examples, a separate MCS may be associated with each SMU and be configured to receive module-specific signals 915 from PCS 910.

The MCS 975 may also be configured to ramp the reactor to match the power plant house load, and to send a signal to the power conversion system (PCS) 910 to immediately start the AAPS 930. The PCS 910 may then auto parallel the AAPS 930 to a 13.8 kv bus 940 associated with service module unit 950, in Droop mode. AAPS 930 may be set to load follow service module unit 950 to allow stable power control of service module unit 950.

PCS 910 may be configured to send a signal 915 to the MCS associated with a plurality of non-SMU units 960 in order to initiate turbine bypass and/or open the generator circuit breaker (GCB) 970 of the non-SMU units 960. At this point, the power plant may be essentially divorced from the distributed electrical grid with all plant loads being supplied by service module unit 950 and/or AAPS 910. Additionally, the plurality of non-SMU units 960 may be disconnected from one or more 13.8 kv busses 980 and placed on turbine bypass. In some examples, a timer may be employed to limit the time on turbine bypass before initiating automatic reactor module shutdown. Power distribution system 900 may be configured to maintain power to onsite AC loads without interruption via switchyard connections to the MPTs and their associated UATs, e.g., as illustrated at FIG. 8.

The following example control sequences may be understood to operate with a power distribution system configuration similar to that of power distribution system 400 illustrated in FIG. 4. In some examples, it may be assumed that the dedicated or vital load (DSL) may be connected to the switchyard via second bus 942. Additionally, first bus 941 may be understood to continue providing power to the distributed electrical grid.

In examples where the dedicated load plus the house load may be within the nominal rating of one power module, such as service module unit 950, the control sequence may substantially the same as previously described, except that second bus 942 may remain closed allowing service module unit 950 to provide power to the dedicated load as well as all house loads. Additionally, AAPS may be used to absorb any rapid load changes within the power plant and at the dedicated load.

In examples where the dedicated load plus the house load may exceed the nominal rating of one power module, a second generator may remain connected to the associated 13.8 kv bus and its GCB 970 may be inhibited from tripping, via an inhibit switch in the MCS 975. The inhibit function may be configured to stop the island mode signal from the MCS 975 caused by the LOOP sensing circuits on first bus 941. All other protective features associated with the GCB may otherwise remain intact. Additionally, turbine bypass may be used to match the generator output to the load, and MCS 975 may then be used to control reactor power to limit turbine bypass flow. Additionally, AAPS 910 may be configured to absorb rapid load changes within the plant site and the dedicated load.

The following example control sequences may be understood to operate with a power distribution system configuration similar to that of power distribution system 500 illustrated in FIG. 5. In some examples, control sequence associated with power distribution system 500 may be understood to operated similarly as power distribution system 400 (FIG. 4) without a connection to the distributed electrical grid.

Standard distribution configuration and monitoring may be employed to establish protection of the local distribution system as well as the generation assets. A double bus configuration may be implemented to provide alternate feeds to the micro-grid sub-stations to enhance reliability. First bus 941 and second bus 942 may be representative of the dual feed to a dedicated service load. If a fault occurred on one line (or the other) that line on which the fault occurred may be set to open, and power may be maintained as long as the fault did not propagate to the other line. If both lines were faulted, the power plant may transition to a basic island mode of operation, in which only house loads of the power plant may be maintained.

Figure 10:
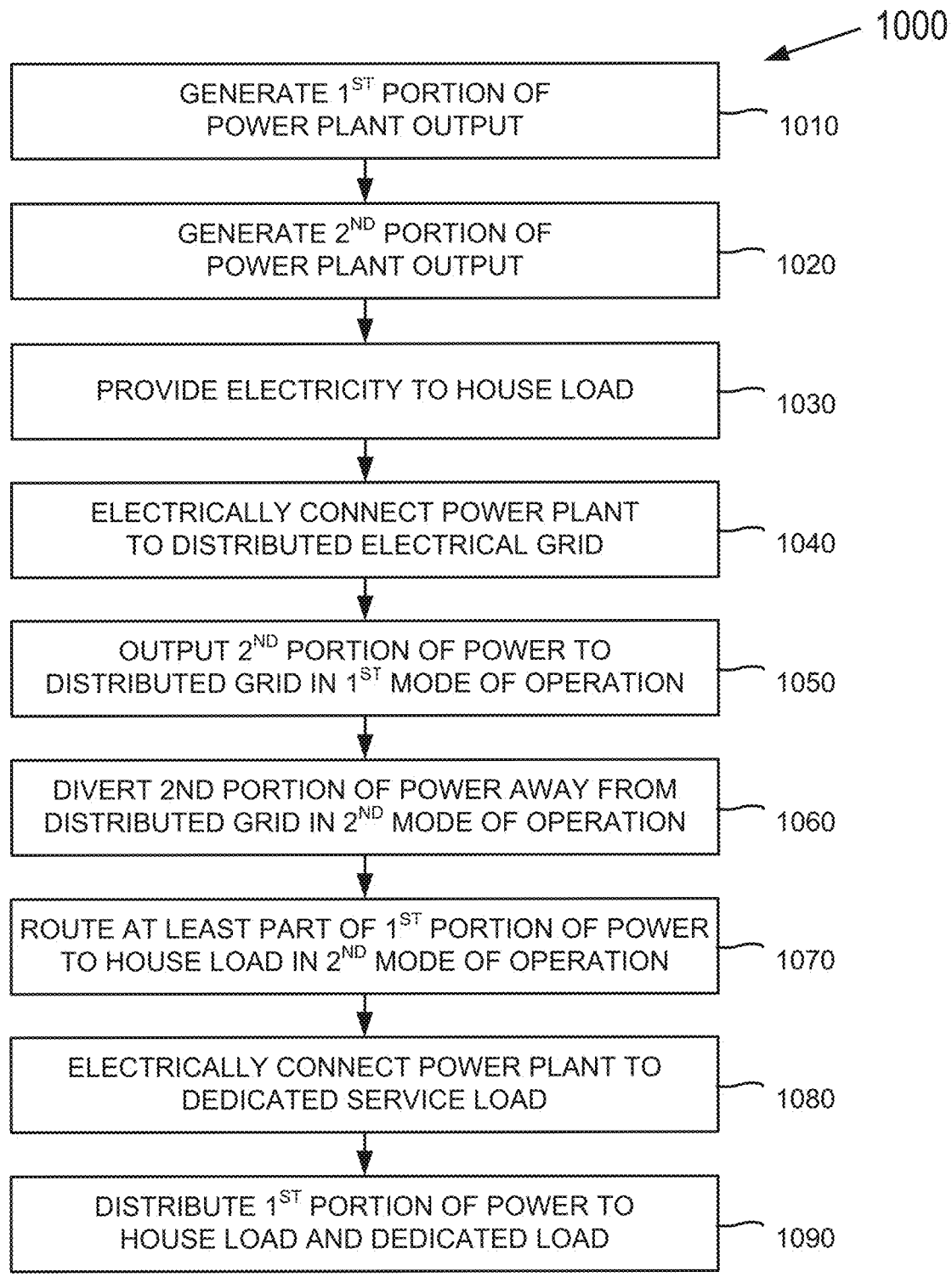
FIG. 10 illustrates an example process for operating a power distribution system that has experienced an interruption of power from a distributed electrical grid.

FIG. 10 illustrates an example process 1000 for operating a power distribution system that has experienced an interruption of power from a distributed electrical grid, or macro grid. At operation 1010, a first portion of power plant output may be generated by one or more nuclear power modules designated as service module units. A remainder of the nuclear power modules may be considered as non-service module units.

The nuclear power modules may be interchangeably designated as service module units according to a predetermined time interval. In some examples, the one or more nuclear power modules may be designated as service module units according to which nuclear power module has most recently been refueled and achieved a threshold number of days of operation.

At operation 1020, a second portion of the power plant output may be generated by the non-service module units.

In some examples, an initial power output may be generated from an on-site non-nuclear power source prior to generating the first and second portions of the power plant output. The initial power output may be generated while the power plant experiences a loss or interruption of power from the distributed electrical grid or is otherwise electrically disconnected from the distributed electrical grid. Additionally, the initial power output may be applied to start a first nuclear power module, and a subsequent power output may be generated from the first nuclear power module. The subsequent power output may be applied to start a second nuclear power module while the power plant is electrically disconnected from the distributed electrical grid. In some examples, additional nuclear power modules may be sequentially started until the power plant is operating at full power.

At operation 1030, electricity may be provided to a number of non-emergency power plant systems associated with a house load of the power plant. The first portion of the power plant output may be equal to or greater than the house load.

At operation 1040, the power plant may be electrically connected to a distributed electrical grid. The distributed electrical grid may be configured to service a plurality of geographically distributed consumers.

At operation 1050 an amount of electricity corresponding to the second portion of the power plant output may be output to the distributed electrical grid in a first mode of operation in which the power plant is connected to the distributed electrical grid.

At operation 1060, the second portion of the power plant output may be diverted away from the distributed electrical grid in a second mode of operation in which the power plant is electrically disconnected from the distributed electrical grid.

In some examples, the power plant may be restricted and/or prohibited from receiving electricity from the distributed electrical grid in the second mode of operation, such as a power output-only mode. The amount of electricity corresponding to the second portion of the power plant output may be output to the distributed electrical grid while the power plant is operating in the second mode of operation.

Additionally, the remainder of the nuclear power modules may be placed in turbine bypass when the power plant is electrically disconnected from the distributed electrical grid. The turbine bypass may be configured to dissipate the second portion of the power plant output while the service modules continue to generate the first portion of the power plant output to service the house load.

At operation 1070, an amount of electricity corresponding to at least part of the first portion of the power plant output may be routed to the power plant systems in the second mode of operation.

At operation 1080, the power plant may be electrically connected to a dedicated electrical is grid. The dedicated electrical grid may be configured to provide electricity to a dedicated service load, and the first portion of the power plant output may be equal to or greater than a combined load of the dedicated service load and the house load.

At operation 1090, the first portion of the power plant output may be distributed to both the power plant systems and the dedicated service load while the power plant is electrically disconnected from the distributed electrical grid in the second mode of operation.

Figure 11:
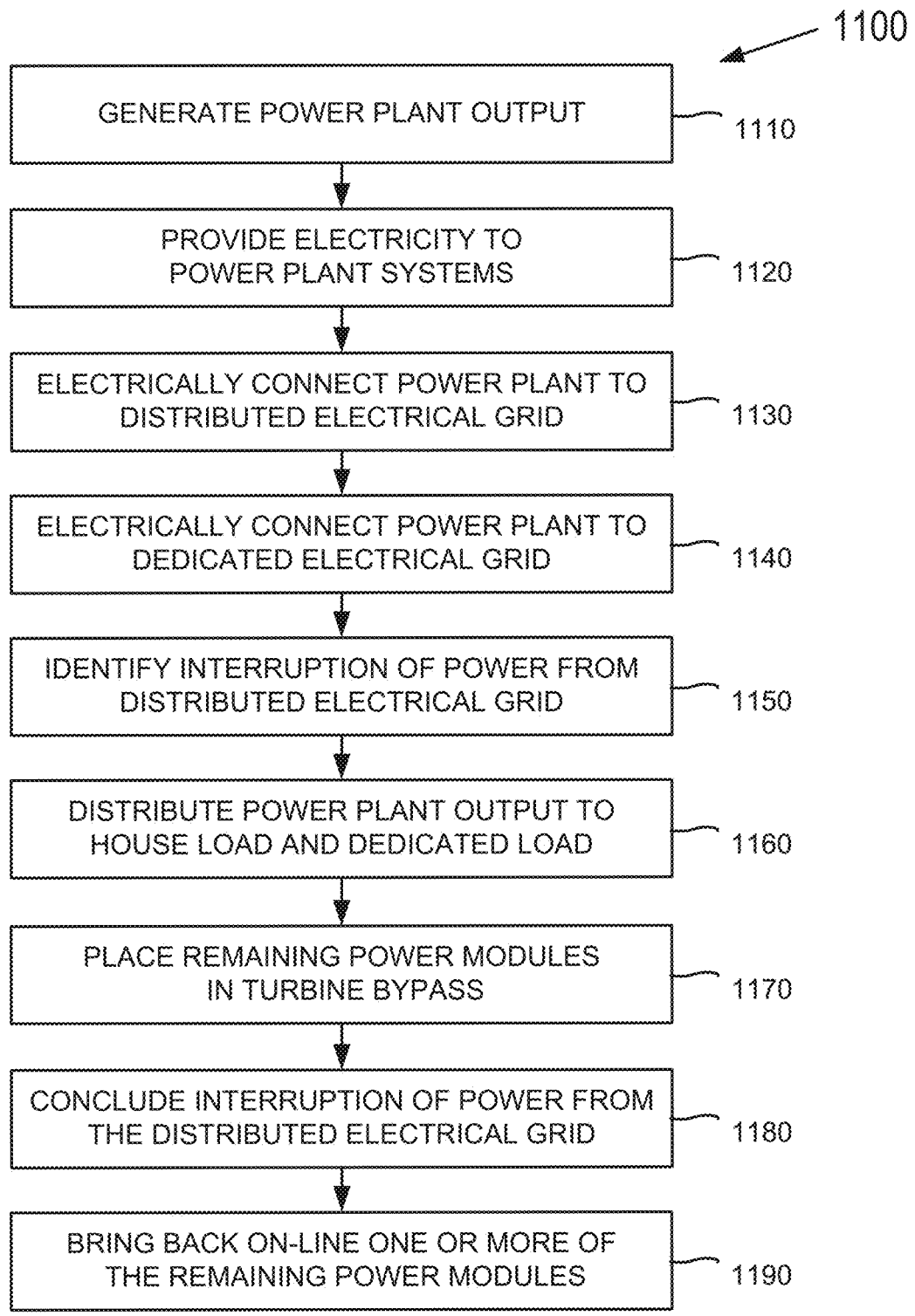
FIG. 11 illustrates an example process for operating a power distribution system configured to provide power to one or more dedicated service loads.
Figure 12:
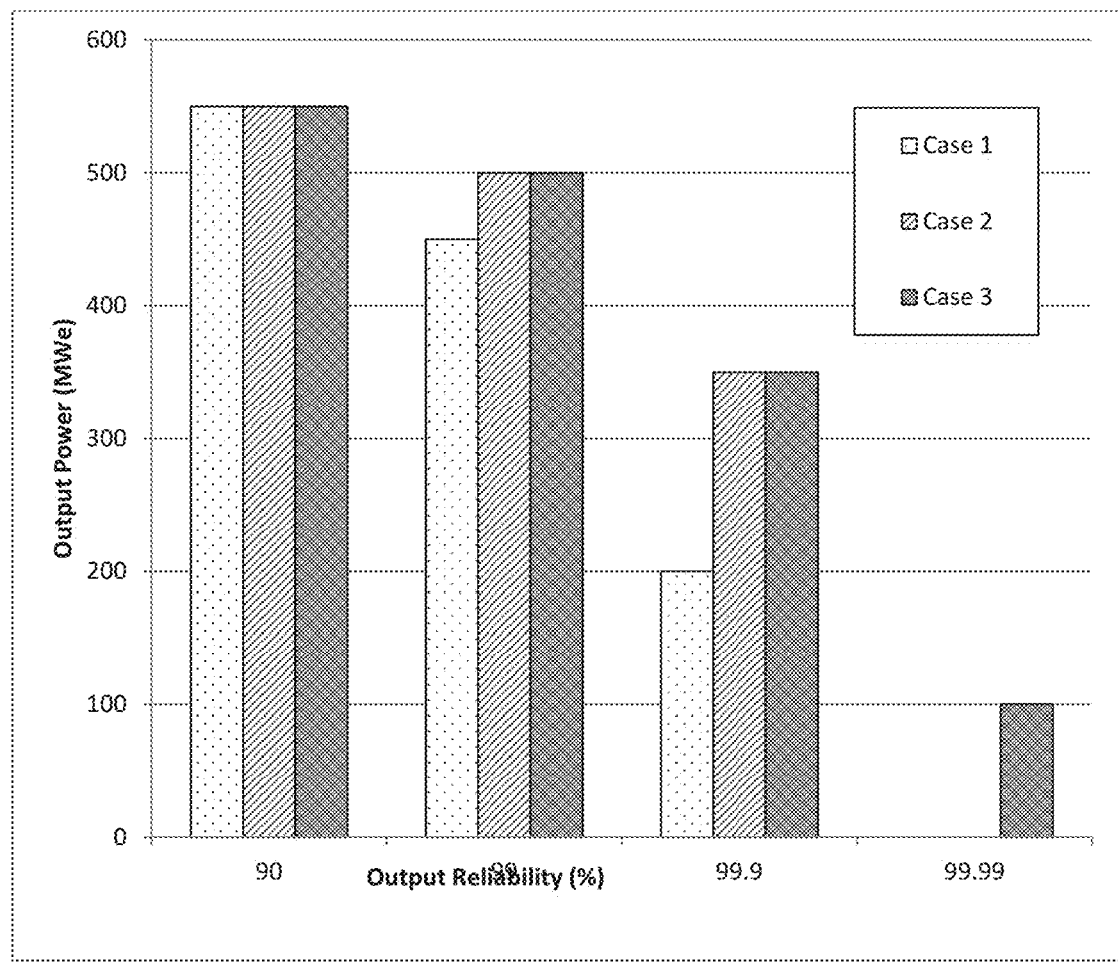
FIG. 12 illustrates a comparison of power reliability for three example cases associated with power distribution systems.

FIG. 11 illustrates an example process 1100 for operating a power distribution system configured to provide power to one or more dedicated service loads. At operation 1110, a power plant output may be generated by one or more on-site nuclear power modules.

At operation 1120, electricity may be provided to a number of non-emergency power plant systems associated with a house load of the power plant.

At operation 1130, the power plant may be electrically connected to a distributed electrical grid. The distributed electrical grid may be configured to service a plurality of geographically distributed consumers;

At operation 1140, the power plant may be electrically connected to a dedicated electrical grid. The dedicated electrical grid may be configured to provide electricity generated from the power plant output to a dedicated service load. Additionally, the power plant output may be equal to or greater than a combined load of the dedicated service load and the house load.

At operation 1150, one or more grid irregularities associated with an interruption of power from the distributed electrical grid may be identified.

At operation 1160, at least a portion of the power plant output may be distributed to both the non-emergency power plant systems and the dedicated electrical grid in response to identifying the interruption of power.

In some examples, one or more of the on-site nuclear power modules may be selected to generate a first portion of the power plant output, and the first portion of the power plant output may be equal to or greater than a combined load of the dedicated service load and the house load. The one or more nuclear power modules that may be selected to generate the first portion of the power plant output according to which nuclear power module has most recently been refueled and achieved a threshold number of days of operation.

The first portion of the power plant output may be distributed to both the non-emergency power plant systems and the dedicated electrical grid during the interruption of power from the distributed electrical grid. Additionally, a remainder of the nuclear power modules may be configured to generate a second portion of the power plant output.

At operation 1170, the remaining nuclear power modules may be placed in turbine bypass during the interruption of power from the distributed electrical grid in order to dissipate the second portion of the power plant output. The remaining nuclear power modules may be placed in turbine bypass while the first portion of the power plant output is distributed to both the non-emergency power plant systems and the dedicated electrical grid.

At operation 1180, the interruption of power from the distributed electrical grid may be concluded. For example, a predetermined period of time may pass since identifying the one or more grid irregularities, which may indicate that the distributed electrical grid has stabilized.

At operation 1190, one or more of the remaining power modules which were placed in turbine bypass may be brought back on-line, and at least part of the second portion of the power plant output generated by the remaining power modules may be provided to the distributed electrical grid.

ADDITIONAL EXAMPLE SYSTEMS, APPARATUS AND METHODS

Example 1

A multi-modular power plant, comprising: a plurality of on-site nuclear power modules configured to generate a power plant output, wherein one or more of the nuclear power modules are designated as service module units which are configured to generate a first portion of the power plant output, and wherein a remainder of the nuclear power modules are configured to generate a second portion of the power plant output; a number of power plant systems which are configured to operate using electricity associated with a house load of the power plant, wherein the first portion of the power plant output is equal to or greater than the house load; and a switchyard configured to electrically connect the power plant to a distributed electrical grid, wherein the distributed electrical grid is configured to service a plurality of geographically distributed consumers, wherein the switchyard is configured to apply the second portion of the power plant output to the distributed electrical grid, and wherein the switchyard is further configured to apply at least part of the first portion of the power plant output to the power plant systems during a loss of power from the distributed electrical grid.

Example 2

The multi-modular power plant of example 1, wherein the number of power plant systems configured to operate using electricity associated with the house load comprise non-emergency systems, and wherein the power plant further comprises a number of passive emergency systems which are configured to operate without any electricity.

Example 3

The multi-modular power plant of example 1, wherein the switchyard is further configured to electrically connect the power plant to a dedicated electrical grid, wherein the dedicated electrical grid is configured to provide electricity to a dedicated service load, wherein the first portion of the power plant output is equal to or greater than a combined load of the dedicated service load and the house load, and wherein the switchyard is configured to distribute the first portion of the power plant output to both the power plant systems and the dedicated service load when the power plant is electrically disconnected from the distributed electrical grid.

Example 4

The multi-modular power plant of example 3, wherein the dedicated service load comprises one or more consumers located off-site from the power plant, and wherein the power plant is configured to provide substantially uninterrupted power to the consumers during the loss of power from the distributed electrical grid.

Example 5

The multi-modular power plant of example 1, wherein the switchyard is configured to restrict the power plant from receiving electricity from the distributed electrical grid while the power plant is operating in a power output-only mode, and wherein the switchyard is configured to output the second portion of the power plant output to the distributed electrical grid while the power plant is operating in the power output-only mode.

Example 6

The multi-modular power plant of example 1, wherein in response to the power plant being electrically disconnected from the distributed electrical grid, the remainder of the nuclear power modules are placed in turbine bypass to dissipate the second portion of the power plant output while the service module units continue to generate the first portion of the power plant output to service the house load.

Example 7

The multi-modular power plant of example 1, wherein the designation of the service modules is interchangeably applied to the nuclear power modules according to a predetermined time interval.

Example 8

The multi-modular power plant of example 1, wherein the designation of the service modules is applied to the one or more nuclear power modules which have most recently been refueled and achieved a threshold number of days of operation.

Example 9

The multi-modular power plant of example 1, further comprising an on-site non-nuclear power source configured to provide sufficient power to start one service module when the power plant is electrically disconnected from the distributed electrical grid and all of the nuclear power modules have been shut down, and wherein the one service module is configured to provide sufficient power to start a second nuclear power module.

Example 10

The multi-modular power plant of example 9, wherein all of the nuclear power modules are sequentially started until the power plant is operating at full power.

Example 11

A method of operating a multi-modular power plant comprising a plurality of on-site nuclear power modules configured to generate a power plant output, the method comprising: generating a first portion of the power plant output by one or more of the nuclear power modules designated as service module units, wherein a remainder of the nuclear power modules are non-service module units; generating a second portion of the power plant output by the non-service module units; providing electricity to a number of non-emergency power plant systems associated with a house load of the power plant, wherein the first portion of the power plant output is equal to or greater than the house load; electrically connecting the power plant to a distributed electrical grid, wherein the distributed electrical grid is configured to service a plurality of geographically distributed consumers; outputting an amount of electricity corresponding to the second portion of the power plant output to the distributed electrical grid in a first mode of operation in which the power plant is connected to the distributed electrical grid; diverting the second portion of the power plant output away from the distributed electrical grid in a second mode of operation in which the power plant experiences an interruption of power from the distributed electrical grid; and routing an amount of electricity corresponding to at least part of the first portion of the power plant output to the power plant systems in the second mode of operation.

Example 12

The example method 11, further comprising: electrically connecting the power plant to a dedicated electrical grid, wherein the dedicated electrical grid is configured to provide electricity to a dedicated service load, and wherein the first portion of the power plant output is equal to or greater than a combined load of the dedicated service load and the house load; and distributing the first portion of the power plant output to both the power plant systems and the dedicated service load while the power plant experiences the interruption of power from the distributed electrical grid.

Example 13

The example method 11, further comprising: restricting the power plant from receiving electricity from the distributed electrical grid; and outputting the amount of electricity corresponding to the second portion of the power plant output to the distributed electrical grid while the power plant is restricted from receiving electricity from the distributed electrical grid.

Example 14

The example method 11, further comprising: placing the remainder of the nuclear power modules in turbine bypass when the power plant is electrically disconnected from the distributed electrical grid; and dissipating the second portion of the power plant output while the service module units continue to generate the first portion of the power plant output to service the house load.

Example 15

The example method 11, further comprising interchangeably designating the nuclear power modules as service module units according to a predetermined time interval.

Example 16

The example method 11, wherein the one or more nuclear power modules are designated as service module units according to which nuclear power module has most recently been refueled and achieved a threshold number of days of operation.

Example 17

The example method 11, further comprising: generating an initial power output from an on-site non-nuclear power source prior to generating the first and second portions of the power plant output, wherein the initial power output is generated while the power plant is electrically disconnected from the distributed electrical grid; applying the initial power output to start a first nuclear power module; generating subsequent power output from the first nuclear power module; and applying the subsequent power output to start a second nuclear power module while the power plant is electrically disconnected from the distributed electrical grid.

Example 18

The example method 17, further comprising sequentially starting additional nuclear power modules until the power plant is operating at full power.

Example 19

A multi-modular power plant, comprising: means for generating electricity from a first portion of a power plant output provided by one or more of a plurality of on-site nuclear power modules designated as service module units, wherein a remainder of the plurality of nuclear power modules are non-service module units, and wherein the first portion of the power plant output is equal to or greater than a house load associated with a number of non-emergency power plant systems; means for generating electricity from a second portion of the power plant output provided by the non-service module units; means for electrically connecting the power plant to a distributed electrical grid, wherein the distributed electrical grid is configured to service a plurality of geographically distributed consumers, and wherein an amount of electricity corresponding to the second portion of the power plant output is provided to the distributed electrical grid while the power plant is electrically connected to the distributed electrical grid; means for diverting the second portion of the power plant output away from the distributed electrical grid when the power plant experiences an interruption of power from the distributed electrical grid; and means for routing an amount of electricity corresponding to at least part of the first portion of the power plant output to the power plant systems while the power plant is electrically disconnected from the distributed electrical grid.

Example 20

The multi-modular power plant of example 19, further comprising: means for connecting the power plant to a dedicated electrical grid, wherein the dedicated electrical grid is configured to provide electricity to a dedicated service load, and wherein the first portion of the power plant output is equal to or greater than a combined load of the dedicated service load and the house load; and means for distributing the first portion of the power plant output to both the power plant systems and the dedicated service load while the power plant is electrically disconnected from the distributed electrical grid.

Although a number of the examples provided herein have primarily described a pressurized water reactor and/or a light water reactor, it should be apparent to one skilled in the art that at least some of the examples may be applied to other types of power systems. For example, one or more of the examples or variations thereof may also be made operable with a boiling water reactor, sodium liquid metal reactor, gas cooled reactor, pebble-bed reactor, and/or other types of reactor designs. Additionally, any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the subject matter claimed herein.

The invention claimed is:

1. A multi-modular power plant, comprising:
a plurality of on-site nuclear power modules configured to generate a power plant output;
a number of power plant systems which are configured to operate using electricity associated with a house load of the power plant; and
a switchyard configured to:
electrically connect the power plant output to a distributed electrical grid, wherein the distributed electrical grid is configured to service a plurality of geographically distributed consumers;
electrically connect the power plant output to a dedicated electrical grid connected to a dedicated service load for one of the geographically distributed consumers, wherein the dedicated electrical grid is configured to provide electricity generated from the power plant output to the dedicated service load, and wherein the power plant output is equal to or greater than a combined load of the dedicated service load and the house load; and distribute at least a portion of the power plant output to both the power plant systems and the dedicated electrical grid;

wherein one or more of the on-site nuclear power modules are configured to generate a first portion of the power plant output, wherein the first portion of the power plant output is equal to or greater than the combined load of the dedicated service load and the house load, and wherein the switchyard is configured to apply the first portion of the power plant output to both the power plant systems and the dedicated electrical grid when the power plant experiences an interruption of power from the distributed electrical grid.

2. The multi-modular power plant of claim 1, wherein the dedicated service load comprises one or more consumers located off-site from the power plant, and wherein the power plant is configured to provide substantially continuous power to the consumers via the dedicated electrical grid during an interruption of power from the distributed electrical grid.

3. The multi-modular power plant of claim 1, wherein the number of power plant systems configured to operate using electricity associated with the house load comprise non-emergency systems, and wherein the power plant further comprises a number of passive emergency systems which are configured to operate without any electricity.

4. The multi-modular power plant of claim 1, wherein a remainder of the on-site nuclear power modules are configured to generate a second portion of the power plant output, and wherein the switchyard is configured to apply the second portion of the power plant output to the distributed electrical grid while the power plant is electrically connected to the distributed electrical grid.

5. The multi-modular power plant of claim 1, wherein the power plant is configured to generate the first portion of the power plant output with a reliability factor of at least 99.9%.

6. The multi-modular power plant of claim 1, wherein the one or more nuclear power modules that generate the first portion of the power plant output are interchangeably selected from the plurality of on-site nuclear power modules in the event that a nuclear power module is unavailable to generate power.

7. The multi-modular power plant of claim 1, wherein the one or more nuclear power modules are selected to generate the first portion of the power plant output according to which of the on-site nuclear power modules have most recently been refueled and achieved a threshold number of days of operation.

8. The multi-modular power plant of claim 1, further comprising an on-site non-nuclear power source configured to provide sufficient power to start one service module when the power plant is disconnected from the distributed electrical grid and all of the on-site nuclear power modules have been shut down, and wherein the one service module is configured to provide sufficient power to start a second nuclear power module while the power plant is disconnected from the distributed electrical grid.

9. The multi-modular power plant of claim 1, wherein the switchyard comprises a double-bus configuration that provides for alternate electrical pathways to deliver the power plant output to the dedicated service load.

10. A method of operating a multi-modular power plant comprising a plurality of on-site nuclear power modules, the method comprising:

generating a power plant output by one or more of the on-site nuclear power modules;

providing electricity to a number of non-emergency power plant systems associated with a house load of the power plant;

electrically connecting the power plant output to a distributed electrical grid, wherein the distributed electrical grid is configured to service a plurality of geographically distributed consumers;

electrically connecting the power plant output to a dedicated electrical grid connected to a dedicated service load for one of the geographically distributed consumers, wherein the dedicated electrical grid is configured to provide electricity generated from the power plant output to the dedicated service load, and wherein the power plant output is equal to or greater than a combined load of the dedicated service load and the house load;

identifying one or more grid irregularities associated with the distributed electrical grid;

distributing at least a portion of the power plant output to both the non-emergency power plant systems and the dedicated electrical grid in response to identifying the one or more grid irregularities; and selecting one or more of the on-site nuclear power modules to generate a first portion of the power plant output, wherein the first portion of the power plant output is equal to or greater than the combined load of the dedicated service load and the house load, and wherein the first portion of the power plant output is distributed to both the non-emergency power plant systems and the dedicated electrical grid during an interruption of power from the distributed electrical grid.

11. The method of claim 10, further comprising:

placing the remaining nuclear power modules in turbine bypass during the interruption of power from the distributed electrical grid, wherein the remaining nuclear power modules are configured to generate a second portion of the power plant output; and dissipating the second portion of the power plant output while the first portion of the power plant output is distributed to both the non-emergency power plant systems and the dedicated electrical grid.

12. The method of claim 11, further comprising:

determining that the interruption of power from the distributed electrical grid has concluded;

bringing back on-line one or more of the remaining power modules; and providing at least part of the second portion of the power plant output to the distributed electrical grid.

13. The method of claim 10, wherein the one or more nuclear power modules are selected to generate the first portion of the power plant output according to which nuclear power module has most recently been refueled and achieved a threshold number of days of operation.

14. A multi-modular power plant, comprising:

means for generating electricity from a power plant output provided by one or more of a plurality of on-site nuclear power modules, wherein at least a portion of the electricity is provided to a number of power plant systems associated with a house load of the power plant;

means for electrically connecting the power plant to a distributed electrical grid, wherein the distributed electrical grid is configured to service a plurality of geographically distributed consumers;

means for electrically connecting the power plant to a dedicated electrical grid, wherein the dedicated electrical grid is configured to provide electricity generated from the power plant output to a dedicated service load, and wherein the power plant output is equal to or greater than a combined load of the dedicated service load and the house load;

means for distributing at least a portion of the power plant output to both the non-emergency power plant systems and the dedicated electrical grid;

means for placing some of the nuclear power modules in turbine bypass during an interruption of power from the distributed electrical grid; and means for determining that the interruption of power from the distributed electrical grid has concluded, wherein one or more of the power modules are brought back on-line in response to determining that the interruption of power has concluded, and wherein at least part of the power plant output is provided to the distributed electrical grid after the one or more power plants have been brought back on-line.

15. The power plant of claim 14, further comprising means for selecting one or more of the on-site nuclear power modules to generate a first portion of the power plant output, wherein the first portion of the power plant output is equal to or greater than the combined load of the dedicated service load and the house load, and wherein the first portion of the power plant output is distributed to both the non-emergency power plant systems and the dedicated electrical grid during an interruption of power from the distributed electrical grid.

16. The power plant of claim 15, further comprising means for placing a remainder of the nuclear power modules in turbine bypass during the interruption of power from the distributed electrical grid, wherein the remaining nuclear power modules are configured to generate a second portion of the power plant output, and wherein the second portion of the power plant output is dissipated via the turbine bypass while the first portion of the power plant output is distributed to both the non-emergency power plant systems and the dedicated electrical grid.

17. The power plant of claim 16, wherein one or more of the remaining power modules are brought back on-line in response to determining that the interruption of power has concluded, and wherein at least part of the second portion of the power plant output is provided to the distributed electrical grid after the one or more remaining power plants have been brought back on-line.

18. The power plant of claim 15, wherein the one or more nuclear power modules are selected to generate the first portion of the power plant output according to which nuclear power module has most recently been refueled and achieved a threshold number of days of operation.

* * * * *

UNITED STATES PATENT AND TRADEMARK OFFICE
CERTIFICATE OF CORRECTION

| | |
|---|---|
| PATENT NO. | : 10,672,528 B2 |
| APPLICATION NO. | : 15/369528 |
| DATED | : June 2, 2020 |
| INVENTOR(S) | : Daniel Ingersoll et al. |

It is certified that error appears in the above-identified patent and that said Letters Patent is hereby corrected as shown below:

In the Specification

In Column 5, Line 37, delete "130," and insert -- 130. --, therefor.

In Column 7, Line 7, delete "112," and insert -- 112. --, therefor.

In Column 7, Line 35, delete "MRS" and insert -- DHRS --, therefor.

In Column 7, Line 40, delete "of the of the" and insert -- of the --, therefor.

In Column 9, Line 47, after "to" delete "is".

In Column 10, Line 1, delete "186," and insert -- 186. --, therefor.

In Column 10, Line 30, after "of" delete "is".

In Column 10, Line 43, delete "that that" and insert -- that --, therefor.

In Column 11, Line 37, delete "refueling," and insert -- refueling --, therefor.

In Column 12, Line 30, delete "RAM" and insert -- RAIR --, therefor.

In Column 16, Line 53, delete "(SIU)," and insert -- (SMU), --, therefor.

In Column 17, Line 63, delete "day" and insert -- days --, therefor.

In Column 17, Line 65, after "or" delete "is".

In Column 18, Line 41, delete "LOOPS" and insert -- LOOPs --, therefor.

Signed and Sealed this
Twenty-seventh Day of October, 2020

Andrei Iancu
*Director of the United States Patent and Trademark Office*

CERTIFICATE OF CORRECTION (continued)
U.S. Pat. No. 10,672,528 B2

In Column 20, Line 51, after "FIG." insert -- 12. --.

In Column 22, Line 37, after "450" delete "is".

In Column 24, Line 32, delete "load," and insert -- load. --, therefor.

In Column 24, Line 50, delete "SGM_0_1" and insert -- SGM_0_1, --, therefor.

In Column 27, Line 37, delete "IV We" and insert -- MWe --, therefor.

In Column 28, Line 43, delete "time, in" and insert -- time. In --, therefor.

In Column 30, Line 59, delete "(FIG. 4)" and insert -- (FIG. 4). --, therefor.

In Column 31, Line 31, delete "operating" and insert -- operating. --, therefor.

In Column 32, Line 10, after "The" delete "is".

In Column 35, Line 50, after "electrical" delete "is".

In Column 36, Line 4, delete "consumers;" and insert -- consumers. --, therefor.